(12) United States Patent
Tokuda et al.

(10) Patent No.: US 10,732,595 B2
(45) Date of Patent: Aug. 4, 2020

(54) CONTROL PARAMETER AUTOMATIC-ADJUSTMENT APPARATUS, CONTROL PARAMETER AUTOMATIC-ADJUSTMENT METHOD, AND CONTROL PARAMETER AUTOMATIC-ADJUSTMENT APPARATUS NETWORK

(71) Applicant: Mitsubishi Hitachi Power Systems, Ltd., Nishi-ku, Yokohama (JP)

(72) Inventors: Yuya Tokuda, Tokyo (JP); Takaaki Sekiai, Tokyo (JP); Yasuhiro Yoshida, Tokyo (JP); Takuya Yoshida, Tokyo (JP); Kazunori Yamanaka, Yokohama (JP); Norihiro Iyanaga, Yokohama (JP); Fumiyuki Suzuki, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 754 days.

(21) Appl. No.: 15/418,976

(22) Filed: Jan. 30, 2017

(65) Prior Publication Data
US 2017/0255177 A1    Sep. 7, 2017

(30) Foreign Application Priority Data
Mar. 3, 2016    (JP) .................. 2016-041619

(51) Int. Cl.
*G05B 19/042* (2006.01)
*G05B 13/04* (2006.01)
(Continued)

(52) U.S. Cl.
CPC ......... *G05B 19/0426* (2013.01); *G05B 13/04* (2013.01); *G05B 17/02* (2013.01);
(Continued)

(58) Field of Classification Search
None
See application file for complete search history.

(56) References Cited

U.S. PATENT DOCUMENTS

| | | | |
|---|---|---|---|
| 2007/0055392 A1* | 3/2007 | D'Amato | G05B 13/048 700/44 |
| 2010/0100248 A1 | 4/2010 | Minto et al. | |

(Continued)

FOREIGN PATENT DOCUMENTS

| | | |
|---|---|---|
| EP | 1 659 461 A1 | 5/2006 |
| JP | 9-152903 A | 6/1997 |

(Continued)

OTHER PUBLICATIONS

Extended European Search Report issued in counterpart European Application No. 17154032.1 dated Aug. 22, 2017 (ten (10) pages).
(Continued)

*Primary Examiner* — Cedric Johnson
(74) *Attorney, Agent, or Firm* — Crowell & Moring LLP

(57) ABSTRACT

Provided is a control parameter automatic-adjustment apparatus that adjusts a control parameter which is used when a control apparatus of a plant calculates an operational control signal, the apparatus including: a simulator that simulates operation of the plant; a learning unit that searches for an optimal control parameter using the simulator; and a knowledge database that stores knowledge information which associates an amount of change in the control parameter with an amount of change in a state of the plant, in which the learning unit includes a search range determination unit that determines a control parameter search range based on the knowledge information that is stored in the knowledge database.

14 Claims, 15 Drawing Sheets

(51) Int. Cl.
   *G06N 20/00* (2019.01)
   *G05B 17/02* (2006.01)
   *G06N 5/02* (2006.01)

(52) U.S. Cl.
   CPC ... *G06N 20/00* (2019.01); *G05B 2219/23005* (2013.01); *G06N 5/02* (2013.01)

(56) References Cited

U.S. PATENT DOCUMENTS

| | | | |
|---|---|---|---|
| 2011/0004390 A1* | 1/2011 | Nomura | F02C 9/28 |
| | | | 701/100 |
| 2014/0107993 A1* | 4/2014 | Cheng | G05B 17/02 |
| | | | 703/13 |
| 2014/0257526 A1 | 9/2014 | Tiwari et al. | |

FOREIGN PATENT DOCUMENTS

| | | | |
|---|---|---|---|
| JP | 2005-70940 A | 3/2005 | |
| JP | 2009-30476 A | 2/2009 | |
| JP | 2009-128972 A | 6/2009 | |
| JP | 2009-162231 A | 7/2009 | |
| JP | 2010-146068 A | 7/2010 | |
| JP | 2010146068 A * | 7/2010 | |
| JP | 2014-174993 A | 9/2014 | |
| JP | 2014174993 A * | 9/2014 | F01K 23/067 |

OTHER PUBLICATIONS

Kamiya, A. et al., "Adaptive-Edge Search for Power Plant Start-Up Scheduling", IEEE Transactions on Systems, Man, and Cybernetics: Part C: Applications and Review, Nov. 1999, vol. 29, No. 4, pp. 518-530, XP011057160 (thirteen (13) pages).

Emmerich, M., "Optimisation of Thermal Power Plant Designs: A Graph-based Adaptive Search Approach", Adaptive Computing in Design and Manufacture V, Jan. 2002, pp. 87-98, XP008185552 (thirteen (13) pages).

Kamiya, A. et al., "Reward Strategies for Adaptive Start-Up Scheduling of Power Plant", Systems, Man, and Cybernetics, 1997. Computational Cybernetics and Simulation, Oct. 1997, vol. 4, pp. 3417-3424, XP010249126 (eight (8) pages).

English translation of document C6 (Japanese-language Office Action issued in counterpart Japanese Application No. 2016-041619 dated Sep. 3, 2019) previously filed on Sep. 16, 2019 (five (5) pages).

English language abstract of document C1 (Kamiya, A., "Reinforcement Learning Applied to Power Plant Start-Up Scheduling", Japanese Society for Artificial Intelligence, Nov. 1997, vol. 12, No. 6, pp. 837-844) previously filed on Jan. 30, 2017 (one (1) page).

* cited by examiner

FIG. 7

| CONTROL PARAMETER | ADJUSTMENT RANGE | STATE A | STATE B | STATE C | ... |
|---|---|---|---|---|---|
| CONTROL PARAMETER 1 | Bmin–B$_1$ | 5.03 | 4.49 | 0.04 | ... |
| | B$_1$–B$_2$ | 0.41 | 5.02 | 6.59 | ... |
| | ... | 9.25 | 2.48 | 6.25 | ... |
| | Bi–Bmax | 5.52 | 3.22 | 8.32 | ... |
| CONTROL PARAMETER 2 | B'min–B'$_1$ | 3.19 | 8.45 | 9.38 | ... |
| | B'$_1$–B'$_2$ | 4.82 | 5.57 | 2.81 | ... |
| | ... | 6.54 | 0.45 | 8.56 | ... |
| | B'i–B'max | 5.38 | 7.31 | 4.91 | ... |
| ... | ... | ... | ... | ... | ... |
| CONTROL PARAMETER M | B''min–B''$_1$ | 7.75 | 7.29 | 8.55 | ... |
| | B''$_1$–B''$_2$ | 7.10 | 7.61 | 4.64 | ... |
| | ... | 5.67 | 8.40 | 7.63 | ... |
| | B''i–B''max | 0.06 | 3.19 | 3.93 | ... |

| DATA NO | CONTROL PARAMETER | | OUTPUT | | |
|---|---|---|---|---|---|
| 1 | CONTROL PARAMETER 1 (P$_{k11}$) | 4 | OUTPUT 1 | 3.21 | ⎫ |
| | CONTROL PARAMETER 1 (P$_{k12}$) | 1 | OUTPUT 2 | 5.89 | |
| | CONTROL PARAMETER 1 (P$_{k13}$) | 5 | OUTPUT 3 | 2.36 | |
| | CONTROL PARAMETER 1 (P$_{k14}$) | 8 | OUTPUT 4 | 1.34 | |
| | ... | ... | ... | ... | |
| | CONTROL PARAMETER 1 (P$_{k1M}$) | 2 | OUTPUT L | 2.56 | |
| 2 | CONTROL PARAMETER 1 (P$_{k21}$) | 3 | OUTPUT 1 | 4.22 | |
| | CONTROL PARAMETER 1 (P$_{k22}$) | 4 | OUTPUT 2 | 5.63 | |
| | CONTROL PARAMETER 1 (P$_{k23}$) | 6 | OUTPUT 3 | 3.44 | ⎬ 360 |
| | CONTROL PARAMETER 1 (P$_{k24}$) | 1 | OUTPUT 4 | 1.56 | |
| | ... | ... | ... | ... | |
| | CONTROL PARAMETER 1 (P$_{k2M}$) | 3 | OUTPUT L | 7.25 | |
| ... | ... | | ... | | |
| h | CONTROL PARAMETER 1 (P$_{kh1}$) | 1 | OUTPUT 1 | 6.12 | |
| | CONTROL PARAMETER 1 (P$_{kh2}$) | 5 | OUTPUT 2 | 3.11 | |
| | CONTROL PARAMETER 1 (P$_{kh3}$) | 2 | OUTPUT 3 | 10.01 | |
| | CONTROL PARAMETER 1 (P$_{kh4}$) | 3 | OUTPUT 4 | 3.46 | |
| | ... | ... | ... | ... | |
| | CONTROL PARAMETER 1 (P$_{khM}$) | 4 | OUTPUT L | 2.91 | ⎭ |

FIG. 9

KNOWLEDGE INFORMATION INPUT SCREEN

| DATA NO | CONTROL PARAMETER | | OUTPUT | |
|---|---|---|---|---|
| 1 | CONTROL PARAMETER 1 | 4 | OUTPUT 1 | 3.21 |
| | CONTROL PARAMETER 2 | 1 | OUTPUT 2 | 5.89 |
| | CONTROL PARAMETER 3 | 5 | OUTPUT 3 | 2.36 |
| | CONTROL PARAMETER 4 | 8 | OUTPUT 4 | 1.31 |
| | ⋮ | ⋮ | ⋮ | ⋮ |
| | CONTROL PARAMETER M | 2 | OUTPUT L | 2.56 |
| 2 | CONTROL PARAMETER 1 | 3 | OUTPUT 1 | 4.22 |
| | CONTROL PARAMETER 2 | 4 | OUTPUT 2 | 5.63 |
| | CONTROL PARAMETER 3 | 6 | OUTPUT 3 | 3.44 |
| | CONTROL PARAMETER 4 | 1 | OUTPUT 4 | 1.56 |
| | ⋮ | ⋮ | ⋮ | ⋮ |

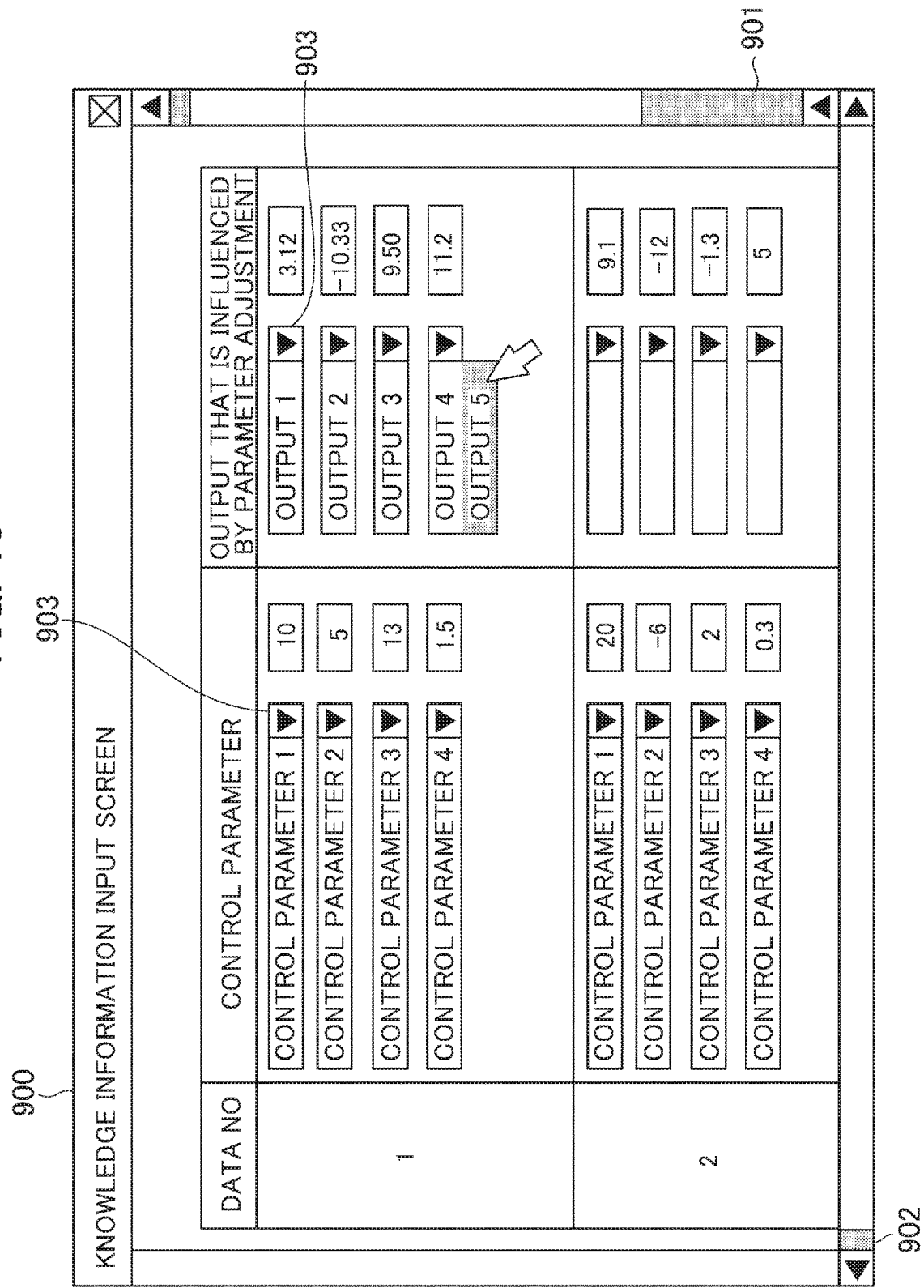

FIG. 11

SEARCH RANGE REDUCTION SCREEN

SEARCH RANGE

BEFORE REDUCTION:1800    AFTER REDUCTION:1020

| | SEARCH RANGE | STATE A | STATE B | STATE C | STATE D | STATE E | STATE F | STATE G | STATE H | STATE I | STATE J | STATE K | STATE L | STATE M | STATE N | STATE O | STATE P | STATE Q | STATE R |
|---|---|---|---|---|---|---|---|---|---|---|---|---|---|---|---|---|---|---|
| CONTROL PARAMETER 1 | $B_{min} - B_1$ | – | – | – | – | – | – | – | – | – | – | – | – | – | – | – | – | – | – |
| | $B_1 - B_2$ | – | – | – | – | – | – | – | – | – | – | – | – | – | – | – | – | – | – |
| | ... | ... | ... | ... | ... | ... | ... | ... | ... | ... | ... | ... | ... | ... | ... | ... | ... | ... | ... |
| | $B_i - B_{max}$ | 3 | 8 | – | – | 5 | – | – | 6 | – | – | – | – | 1 | 6 | 5 | 0 | 6 | 4 |
| CONTROL PARAMETER 2 | $B'_{min} - B'_1$ | 5 | 2 | – | – | 2 | 0 | – | 7 | 3 | 4 | 5 | – | 0 | 7 | 8 | 0 | 1 | 5 |
| | $B'_1 - B'_2$ | 6 | 7 | – | – | 5 | 7 | – | – | 6 | 0 | 0 | 3 | – | – | – | – | – | – |
| | ... | ... | ... | ... | ... | ... | ... | ... | ... | ... | ... | ... | ... | ... | ... | ... | ... | ... | ... |
| | $B'_i - B'_{max}$ | 0 | 1 | – | 3 | 4 | 9 | – | 9 | – | 4 | – | 1 | 3 | 4 | 0 | 6 | 8 | 2 |
| CONTROL | $B''_{min} - B''_1$ | 4 | 4 | – | – | 7 | 8 | – | 1 | 5 | 3 | 6 | – | 1 | 2 | 3 | 0 | 5 | 0 |

ADJUSTMENT RANGES EXCLUDED FROM SEARCH RANGE

CONTROL PARAMETER AUTOMATIC-ADJUSTMENT APPARATUS, CONTROL PARAMETER AUTOMATIC-ADJUSTMENT METHOD, AND CONTROL PARAMETER AUTOMATIC-ADJUSTMENT APPARATUS NETWORK

BACKGROUND OF THE INVENTION

Field of the Invention

The present invention relates to plant control.

Background Art

A control apparatus of a plant calculates an operational control signal for performing operational control of the plant, using a measurement signal that is measured in the plant and a control parameter. In order to operate the plant in such a manner that the plant produces desired performance, there is a need to suitably adjust a setting value of the control parameter that is used when calculating the operational control signal. When multiple control parameters are present, it is difficult to manually search for a setting value of the control parameter for producing the desired performance. For this reason, a technology that automatically makes an optimal adjustment of the setting value of the control parameter according to a purpose is required in a control apparatus of the plant.

Disclosed in JP-A-2009-030476 is a technology in which a result of calculation that uses a dynamic-characteristic simulator is stored in a simulation database and the stored data is learned with a neural network and thus an optimal solution in accordance with a purpose is searched for.

A technology in which, in activation control of a combined cycle power generating plant that is a kind of power generating plants, a setting value of a control parameter of an activation control apparatus is optimally adjusted based on the reinforcement learning theory is disclosed in KAMIYA Akimoto, "Reinforcement Learning Applied to Power Plant Start-Up Scheduling", The Japanese Society for Artificial Intelligence, Vol. 12, No. 6, P 837-844 (1997/11). In this technology, firstly, a control parameter search range that satisfies an activation restriction condition is determined using a genetic algorithm. Then, a suitable setting value of the suitable control parameter is searched for within the determined control parameter search range using reinforcement learning.

As a technology that makes an optimal adjustment of the setting value of the control parameter according to a control purpose and a restriction condition, there is a learning algorithm that uses the neural network that is disclosed in JP-A-2009-030476, or a learning algorithm that uses the genetic algorithm and the reinforcement learning that are disclosed in KAMIYA Akimoto, "Reinforcement Learning Applied to Power Plant Start-Up Scheduling", The Japanese Society for Artificial Intelligence, Vol. 12, No. 6, P 837-844 (1997/11). These learning algorithms involve repeated calculation using a simulator that is equipped with a model of a control target when calculating an optimal value of the control parameter.

The calculation time required to optimize the control parameter is in proportion to the control parameter search range. The search range increases exponentially according to the number of types of control parameters to be optimized or the number of divisions of the setting value of the control parameter. Accordingly, as the number of types of control parameters or the number of divisions of the setting values of each control parameter gets larger, the calculation time increases. When performing plant operation, there is also a case where the setting value of the control parameter has to be adjusted within a limited time. Accordingly, in a case where the calculation time for the optimization is long, there is a need to employ ingenuity to shorten the calculation time.

As a method of shortening the calculation time for the optimization of the control parameter, there is a method of reducing the search range. In JP-A-2009-030476, the whole range of values that the setting value of the control parameter can take is set as the search range. Accordingly, in a case where the search range is large, the calculation time gets long. On the other hand, the search range for the reinforcement learning is reduced by searching for the setting value of the control parameter that satisfies the activation restriction condition with the genetic algorithm, using the simulator, in KAMIYA Akimoto, "Reinforcement Learning Applied to Power Plant Start-Up Scheduling", The Japanese Society for Artificial Intelligence, Vol. 12, No. 6, P 837-844 (1997/11). However, in a case where a calculation load on the simulator is heavy, it takes time to reduce the search range. Accordingly, there is a likelihood that the calculation time for the optimization will not be shortened.

SUMMARY OF THE INVENTION

An object of the present invention, which was made in view of the problems described above, is to provide a control parameter automatic-adjustment apparatus or a control parameter automatic-adjustment method, in which a control parameter can be automatically optimized according to a purpose while satisfying a restriction condition for plant management and the calculation time required to optimize the control parameter can be shortened.

In order to solve the problems described above, according to an aspect of the present invention, there is provided a control parameter automatic-adjustment apparatus that adjusts a control parameter which is used when a control apparatus of a plant calculates an operational control signal, the apparatus including: a simulator that simulates operation of the plant; a learning unit that searches for an optimal control parameter using the simulator; and a knowledge database that stores knowledge information which associates an amount of change in the control parameter with an amount of change in a state of the plant, in which the learning unit includes a search range determination unit that determines a control parameter search range based on the knowledge information that is stored in the knowledge database.

According to the present invention, a control parameter can be automatically optimized according to a purpose while satisfying a restriction condition for plant management and the calculation time required to optimize the control parameter can be shortened.

BRIEF DESCRIPTION OF THE DRAWINGS

FIG. 7 is a diagram illustrating an aspect of data that is stored in a control parameter evaluation database according to the first embodiment of the present invention.

FIG. 8 is a diagram illustrating an aspect of data that is stored in a knowledge database according to the first embodiment of the present invention.

FIG. 9 is a diagram illustrating an example of a knowledge information input screen according to the first embodiment of the present invention.

FIG. 10 is a diagram illustrating another example of the knowledge information input screen according to the first embodiment of the present invention.

FIG. 11 is a diagram illustrating another example of a search range reduction screen according to the first embodiment of the present invention.

DETAILED DESCRIPTION OF THE INVENTION

Figure 1:
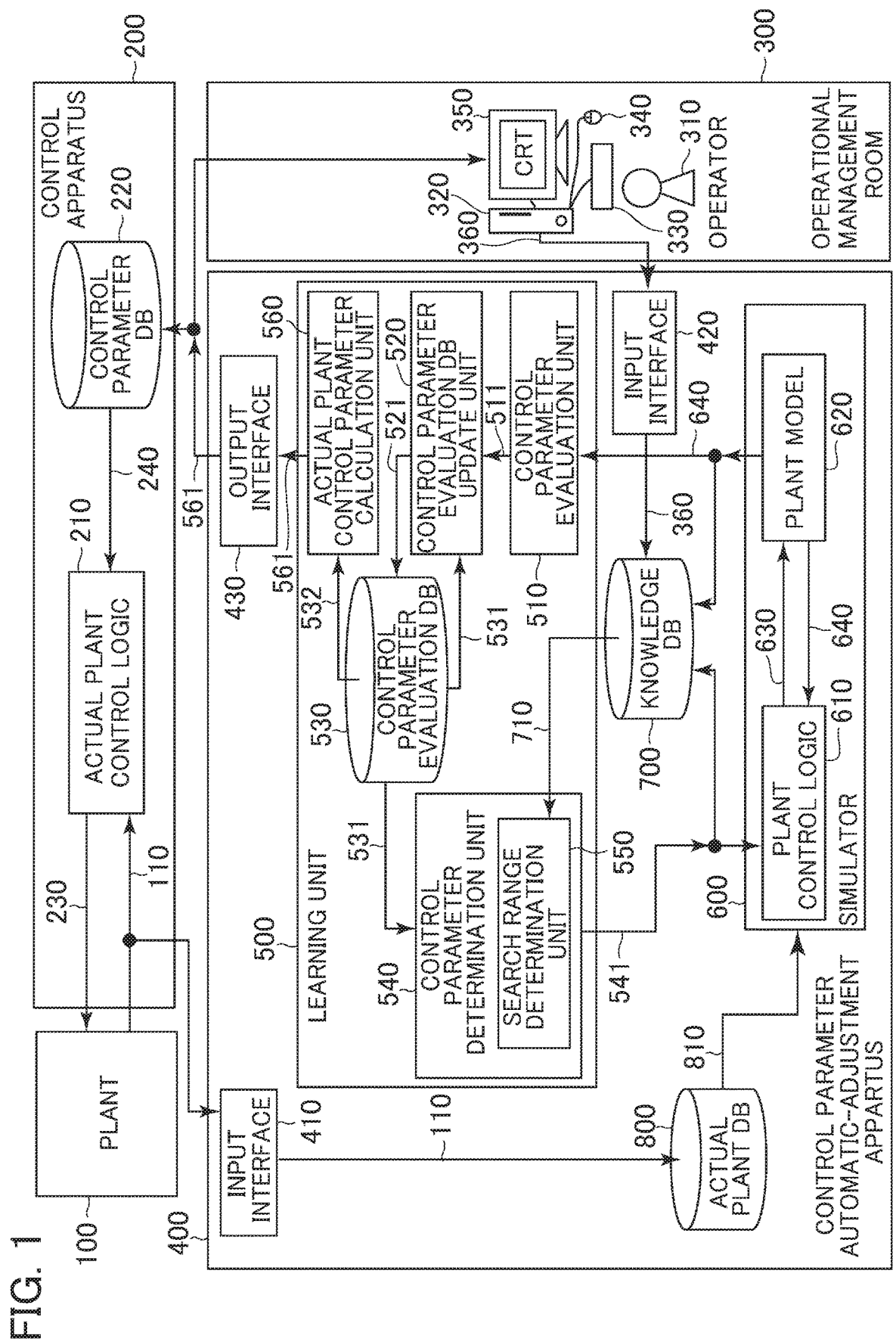
FIG. 1 is a block diagram illustrating a constitution of a control parameter automatic-adjustment apparatus according to a first embodiment of the present invention.

As an embodiment of a control parameter automatic-adjustment apparatus according to the present invention, a case where a control parameter for a power generating plant as a general plant is optimized will be described below referring to the drawings.

First Embodiment

FIG. 1 is a block diagram illustrating a constitution of a control parameter automatic-adjustment apparatus according to a first embodiment of the present invention. A control parameter automatic-adjustment apparatus (computer) 400 in FIG. 1 is an apparatus that adjusts a control parameter which a control apparatus 200 that controls a plant 100 uses when calculating an operational control signal 230 that is transmitted to the plant 100.

The control apparatus 200 includes an actual plant control logic 210 as an arithmetic operation apparatus, and a control parameter database 220. Incidentally, the term "DB" in the drawings is an abbreviation for database.

The actual plant control logic 210 receives a measurement signal 110 from the plant 100, and a control parameter 240 for an actual plant control logic, which is stored in the control parameter database 220, and calculates the operational control signal 230. It is noted here that the control parameter 240 for the actual plant control logic is a setting value for a parameter (for example, a gain for a proportional integral controller, a parameter for determining the shape of a function, or the like) that is used to calculate the operational control signal 230.

A setting value for the control parameter that is stored in the control parameter database 220 is updated by receiving a control parameter 561 for an actual plant from the control parameter automatic-adjustment apparatus 400.

The control parameter automatic-adjustment apparatus (computer) 400 includes a central processing unit (CPU) that includes a portion called a learning unit 500, a portion called a simulator 600, a knowledge database 700, an actual plant database 800, an input interface 410, an input interface 420, and an output interface 430. The CPU is programmed to perform the operations of the control parameter automatic-adjustment apparatus 400 described herein.

The control parameter automatic-adjustment apparatus 400 calculates the control parameter 561 for the actual plant using the learning unit 500 and the simulator 600.

The learning unit 500 transmits the control parameter 541 to the simulator 600. The simulator 600 performs simulation analysis on performance that result when operating the plant 100 using the control parameter 541, and transmits a simulation measurement signal 640 as a result of the analysis to the learning unit 500. The learning unit 500 adjusts the setting value for the control parameter in such a manner that plant operation performance corresponds to a desired performance, using the simulation measurement signal 640 that is obtained from the simulator 600, and transmits the control parameter 541 again to the simulator 600. As above described, the control parameter automatic-adjustment apparatus 400 can search for an optimal value for the control parameter by repeating the simulation analysis of a plant operation and the adjustment of the setting value for the control parameter.

The simulator 600 includes a plant model 620 that simulates the plant 100, and a plant control logic 610 that simulates the actual plant control logic 210. The plant control logic 610, receiving the control parameter 541 calculated using the learning unit 500, outputs a simulation operational control signal 630 to the plant model 620. The plant model 620 calculates the simulation measurement signal 640 using the simulation operational control signal 630, and outputs the simulation measurement signal 640 to the learning unit 500. As above described, by repeatedly testing the control parameter 541 with the simulator 600, the control parameter 561 for the actual plant is optimized that is output to the control parameter database 220.

As an optimization method, reinforcement learning, a genetic algorithm, a neural network, Bayesian learning, linear programming, or the like can be employed. Described below is a case where the reinforcement learning is employed as the optimization method.

The learning unit 500 includes a control parameter evaluation unit 510, a control parameter evaluation database update unit 520, a control parameter evaluation database 530, a control parameter determination unit 540, and an actual plant control parameter calculation unit 560.

The control parameter evaluation unit 510 acquires as an input the simulation measurement signal 640 from the plant model 620 of the simulator 600, and outputs a control parameter evaluation value 511 to the control parameter evaluation database update unit 520. It is noted here that the control parameter evaluation value 511 is an evaluation value for the control parameter 541 and is set according to the degree to which a purpose is achieved with the control parameter. For example, in a case where the purpose is to operate the plant at or below a limit value of an operation restriction condition, an evaluation value for the control parameter that is equal to or less than the limit value is set high, and an evaluation value for the control parameter that exceeds the limit value is set low.

The control parameter evaluation database update unit 520 calculates a control parameter evaluation expectation update value 521 using the control parameter evaluation value 511 and a control parameter evaluation expectation value 531. It is noted here that the control parameter evaluation expectation value 531 is an expected value of the control parameter evaluation value 511 for the control parameter 541, and the control parameter evaluation expectation update value 521 is an update value for the control parameter evaluation expectation value 531. When the control parameter evaluation value 511 is greater than the control parameter evaluation expectation value 531, the control parameter evaluation expectation update value 521 gets a value that is obtained by adjusting upward the control parameter evaluation expectation value 531. When the control parameter evaluation value 511 is smaller than the control parameter evaluation expectation value 531, the control parameter evaluation expectation update value 521 gets a value that is obtained by adjusting downward the control parameter evaluation expectation value 531.

The control parameter evaluation database 530 receives and stores the control parameter evaluation expectation update value 521 from the control parameter evaluation database update unit 520. The control parameter determination unit 540 acquires as an input the control parameter evaluation expectation value 531 from the control parameter evaluation database 530, and outputs the control parameter 541 to the plant control logic 610 of the simulator 600. The setting value for the control parameter 541 that is output from the control parameter determination unit 540 is determined within a control parameter search range that is set by a search range determination unit 550.

The search range determination unit 550 determines, using knowledge information 710, a range from which the control parameter 541 can be selected. It is noted here that the knowledge information 710 is a predicted value of the simulation measurement signal 640 that is output from the simulator 600 by inputting the control parameter 541 into the simulator 600. The search range determination unit 550, based on the knowledge information 710, includes within the search range the control parameter that has the likelihood of being an optimal control parameter, and excludes from the search range the control parameter that does not have the likelihood of being an optimal control parameter. Accordingly, the control parameter search range is reduced, and thus the learning time can be shortened.

The actual plant control parameter calculation unit 560 acquires as an input the optimal control parameter 532 from the control parameter evaluation database 530. The actual plant control parameter calculation unit 560 outputs, through the output interface 430, one or more of the following: the control parameter 561 for the actual plant; data of an optimal value for the control parameter in accordance with an initial state of the plant; the predicted calculation time required for optimization; data of the control parameter evaluation expectation value 531 for the elapsed time or the number of trials; data of the simulation measurement signal 640 for the elapsed time or the number of trials; the control parameter search range and its increments and decrements; and any one piece of information that is stored in each database in the control parameter automatic-adjustment apparatus 400, to the control parameter database 220 of the control apparatus 200 and an image display device 350 in an operational management room 300. It is noted here that the optimal control parameter 532 is a setting value for the control parameter, which the control parameter evaluation expectation value, and the control parameter 561 for the actual plant is data obtained by converting the optimal control parameter 532 into a data format that the control parameter database 220 can deal with.

The knowledge database 700 stores as knowledge information an association data between the control parameter 541 and the simulation measurement signal 640. Additionally, the knowledge database 700 also stores knowledge information 360 that is input through the input interface 420.

The actual plant database 800 receives the measurement signal 110 from the plant through the input interface 410. Additionally, the actual plant database 800 outputs operation data 810 to the simulator 600, thereby improving the precision of the plant model 620.

The simulator 600, although not illustrated, has a function of adjusting, based on the operation data 810 that is acquired from the actual plant database 800, the plant model 620 in such a manner that model errors in the plant model 620 are minimized.

The knowledge information 360 that is stored in the knowledge database 700 is output from the operational management room 300. The operational management room 300 is equipped with a computer including an information input and output calculation apparatus (CPU) 320, a keyboard 330 and a mouse 340 that function as information input devices, and the image display device 350. The information input and output calculation apparatus 320 outputs the knowledge information 360 to the knowledge database 700 according to an operation of the keyboard 330 or the mouse 340 by an operator 310.

Incidentally, according to the present embodiment, the learning unit 500, the simulator 600, the knowledge database 700, and the actual plant database 800 are arranged in the control parameter automatic-adjustment apparatus 400, but a constitution may be employed in which one or several of them are arranged out of the control parameter automatic-adjustment apparatus 400 and only data is transmitted to or received from them.

Figure 2:
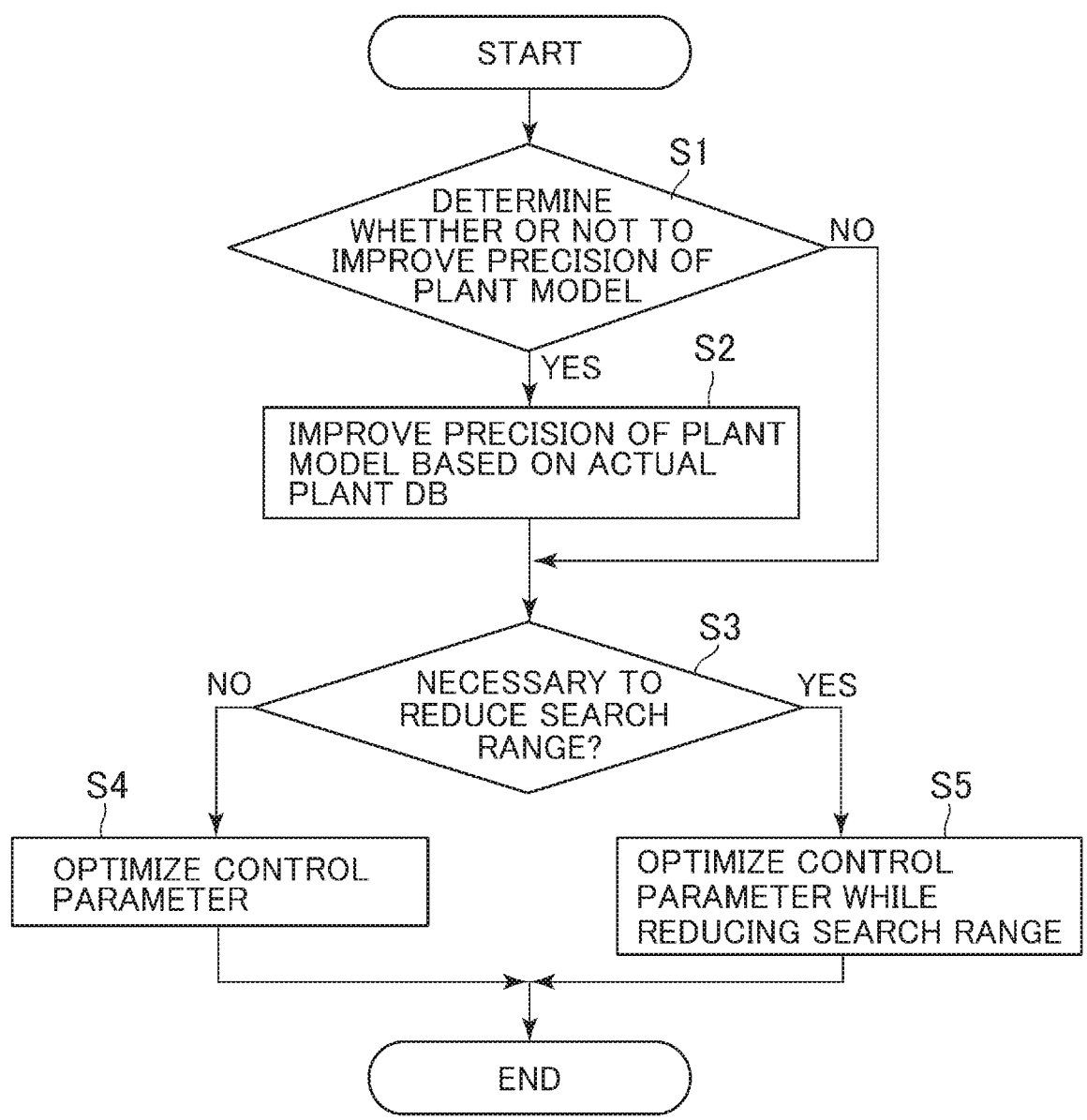
FIG. 2 is a flowchart illustrating operation of the control parameter automatic-adjustment apparatus according to the first embodiment of the present invention.

FIG. 2 is a flowchart illustrating operation of the control parameter automatic-adjustment apparatus 400. As illustrated in FIG. 2, the present flowchart comprises Steps S1 to S5.

First, in Step S1, it is determined whether or not to improve the precision of the plant model 620. If an error between the measurement signal 110 and the simulation measurement signal 640 exceeds a prescribed value that is set in advance by the operator 310, it is determined YES. If not, it is determined NO. When determined YES in Step S1, Step S2 will be performed. When determined NO in Step S1, Step S3 will be performed. An Error E between the measurement signal 110 and the simulation measurement signal 640 is calculated using such as Expression (1) below.

$$E = |C_p - C_s|/C_p \qquad \text{Expression (1)}$$

where, $C_p$ is a portion of the measurement signal, and $C_s$ is a portion of the simulation measurement signal. However, a method of calculating the error between the measurement signal 110 and the simulation measurement signal 640 is not limited to Expression (1) described above.

In Step S2, the actual plant database 800 receives the measurement signal 110 from the plant 100 through the input interface 410. Thereafter, the actual plant database 800 outputs the operation data 810 to the simulator 600, and updates the plant model 620. Thus, performance of the plant model 620 and performance of the plant 100 are made to agree with each other.

In Step S3, using the search range determination unit 550, it is determined whether or not to perform a processing of reducing the control parameter search range. Specifically, the calculation time required to optimize the control parameter is estimated using such as Expression (2) below. If the estimated calculation time exceeds the limit time that is set in advance by the operator 310, it is determined YES. If not, it is determined NO.

$$T_f = a \times V \times T_s \quad \text{Expression (2)}$$

where, $T_f$ is the calculation time required to optimize the control parameter, a is a constant such as a gain, V is the number of search range, and $T_s$ is the one-time analysis time consumed since the simulator 600 being activated until the simulation measurement signal 640 being output. When determined YES in Step S3, Step S5 will be performed. When determined NO in Step S3, Step S4 will be performed. Additionally, the number of search range V is calculated using such as Expression (3) below.

$$V = S \times M \quad \text{Expression (3)}$$

where, S is the number of operation states of the plant, and M is the number of types of control parameters. The operation state of the plant is a feature quantity of a plant measurement signal before starting the plant operation or while the plant is in operation, which is a factor for increasing or decreasing the control parameter evaluation expectation update value 521. However, an expression with which the calculation time required to optimize the control parameter is estimated and an expression with which the number of search range is obtained are not limited to Expression (2) and Expression (3), which are described above.

In Step S4, the control parameter is optimized without reducing the control parameter search range. Step S4 will be described in detail referring to FIG. 3.

In Step S5, the control parameter is optimized while reducing the control parameter search range. The calculation time required to optimize the control parameter can be shortened by reducing the control parameter search range. Step S5 will be described in detail below referring to FIG. 4.

Figure 3:
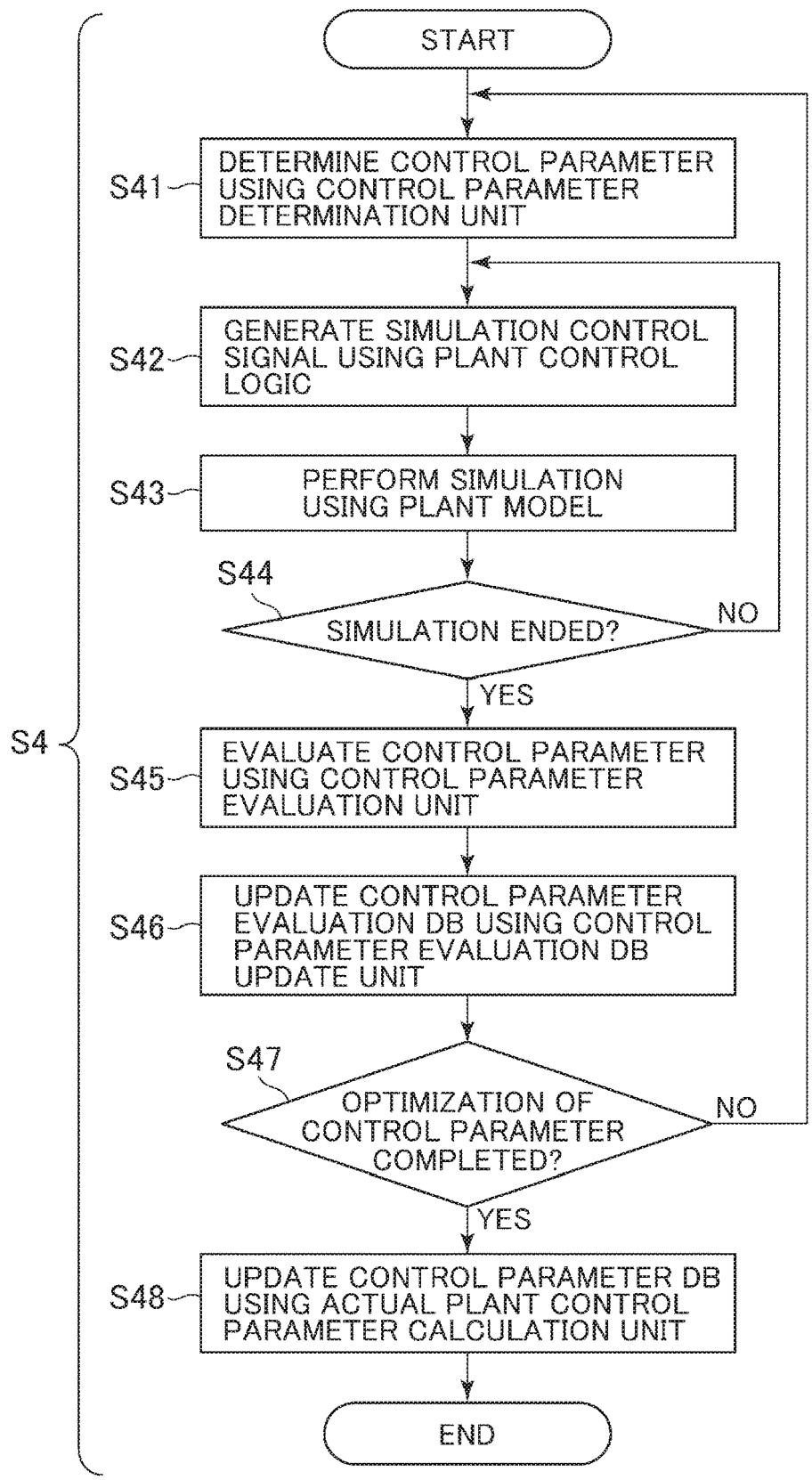
FIG. 3 is a flowchart illustrating in detail "optimize control parameter" that is illustrated in FIG. 2.

FIG. 3 is a flowchart illustrating Step S4 in detail. As illustrated in FIG. 3, Step S4 comprises Steps S41 to S48.

First, in Step S41, the control parameter determination unit 540 is put into operation. The control parameter determination unit 540 determines the control parameter 541 using the control parameter evaluation expectation value 531 in the control parameter evaluation database 530. In the reinforcement learning, the probability of selecting a setting value for the control parameter, for which value the control parameter evaluation expectation value 531 is large, is set high. Incidentally, the probability of selecting a setting value for the control parameter, for which value the control parameter evaluation expectation value 531 is low, is not excluded, and thus the search by trial and error can be performed. Additionally, in Step S4, since the control parameter search range is not reduced, the search range determination unit 550 is not put into operation.

In subsequent Steps S42 to S44, the simulator 600 is put into operation. A processing sequence of Steps S42 to S44 is performed within one control cycle.

In Step S42, the plant control logic 610 is put into operation. The plant control logic 610 generates, using the control parameter 541, the simulation operational control signal 630 that controls the plant model 620.

In Step S43, the plant model 620 is put into operation. The plant model 620 analyzes the plant operation using the simulation operational control signal 630, and outputs the simulation measurement signal 640 as the analysis result to the control parameter evaluation unit 510.

In Step S44, it is determined whether or not the simulation as an evaluation target is ended. If the simulation is ended, it is determined YES. If the simulation is not ended, it is determined NO. When determined YES in Step S44, Step S45 will be performed. When determined NO in Step S44, Step S42 will be performed again.

In Step S45, the control parameter evaluation unit 510 is put into operation. The control parameter evaluation unit 510 calculates the control parameter evaluation value 511 using the simulation measurement signal 640.

In Step S46, the control parameter evaluation database update unit 520 is put into operation. The control parameter evaluation database update unit 520 outputs the control parameter evaluation expectation update value 521 using the control parameter evaluation value 511 and the control parameter evaluation expectation value 531. The control parameter evaluation expectation update value 521 is stored in the control parameter evaluation database 530.

In Step S47, it is determined whether or not the optimization of the control parameter is completed. If a change in a data value that is stored in the control parameter evaluation database 530 converges to or less than a prescribed value which is set in advance, it is determined YES. Furthermore, in Step S47, the number of times that the data value that is stored in the control parameter evaluation database 530 is changed is recorded and if the number of times exceeds a prescribed value that is set in advance, it is also determined YES. On the other hand, if the change in the data value that is stored in the control parameter evaluation database 530 does not converge to or less than a prescribed value that is set in advance and the number of times that the data value that is stored in the control parameter evaluation database 530 is changed is equal to or less than a prescribed value that is set in advance, it is determined NO. When determined YES in Step S47, Step S48 will be performed. When determined NO in Step S47, Step S41 will be performed again.

In Step S48, the actual plant control parameter calculation unit 560 is put into operation. The actual plant control parameter calculation unit 560 acquires, from among pieces of data that are stored in the control parameter evaluation database 530, one or more optimal control parameters 532 for which the control parameter evaluation expectation values are large, and outputs the control parameter 561 for the actual plant to the control parameter database 220.

Figure 4:
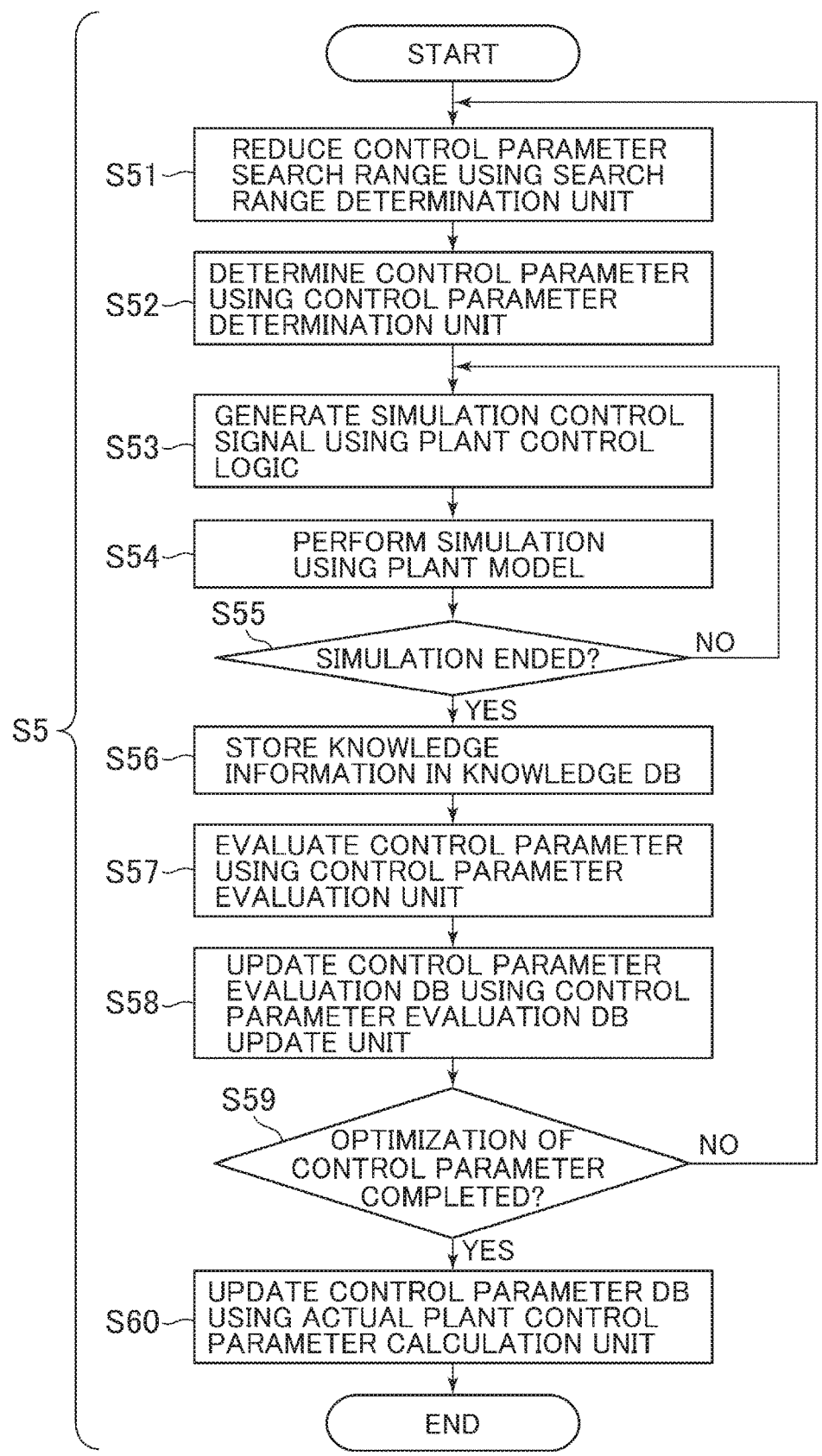
FIG. 4 is a flowchart illustrating in detail "optimize control parameter while reducing search range" that is illustrated in FIG. 2.

FIG. 4 is a flowchart illustrating in detail Step S5 that is illustrated in FIG. 2. As illustrated in FIG. 4, Step S5 comprises Steps S51 to S60. Step S5 that is illustrated in FIG. 4 differs from Step S4 that is illustrated in FIG. 3 in that Step S51 and Step S56 are added.

First, in Step S51, the search range determination unit 550 is put into operation. The search range determination unit 550 acquires as an input the knowledge information 710 from the knowledge database 700, and reduces the control parameter search range. Step S51 will be described in detail below referring to FIG. 5.

In Step S52, the control parameter determination unit 540 is put into operation. The control parameter determination unit 540 determines the control parameter 541 using the control parameter evaluation expectation value 531 in the control parameter evaluation database 530.

In subsequent Steps S53 to S55, the simulator 600 is put into operation. A processing sequence of Steps S53 to S55 is performed within one control cycle.

In Step S53, the plant control logic 610 is put into operation. The plant control logic 610 generates the simulation operational control signal 630 that controls the plant model 620 using the control parameter 541.

In Step S54, the plant model 620 is put into operation. The plant model 620 analyzes the plant operation using the simulation operational control signal 630, and outputs the simulation measurement signal 640 as the analysis result to the control parameter evaluation unit 510.

In Step S55, it is determined whether or not the simulation as an evaluation target is ended. If the simulation is ended, it is determined YES. If the simulation is not ended, it is determined NO. When determined YES in Step S55, Step S56 will be performed. When determined NO in Step S55, Step S53 will be performed again.

In Step S56, knowledge information that associates the control parameter 541 with the simulation measurement signal 640 is stored in the knowledge database 700.

In Step S57, the control parameter evaluation unit 510 is put into operation. The control parameter evaluation unit 510 calculates the control parameter evaluation value 511 using the simulation measurement signal 640.

In Step S58, the control parameter evaluation database update unit 520 is put into operation. The control parameter evaluation database update unit 520 calculates the control parameter evaluation expectation update value 521 using the control parameter evaluation value 511 and the control parameter evaluation expectation value 531. The control parameter evaluation expectation update value 521 is stored in the control parameter evaluation database 530.

In Step S59, it is determined whether or not the optimization of the control parameter is completed. If the change in the data value that is stored in the control parameter evaluation database 530 converges to or less than a prescribed value which is set in advance, it is determined YES. Furthermore, in Step S59, the number of times that the data value that is stored in the control parameter evaluation database 530 is changed is recorded and if the number of times exceeds a prescribed value that is set in advance, it is also determined YES. On the other hand, if the change in the data value that is stored in the control parameter evaluation database 530 does not converge to or less than a prescribed value that is set in advance and the number of times that the data value that is stored in the control parameter evaluation database 530 is changed is equal to or less than a prescribed value that is set in advance, it is determined NO. When determined YES in Step S59, Step S60 will be performed. When determined NO in Step S59, Step S51 will be performed again.

In Step S60, the actual plant control parameter calculation unit 560 is put into operation. The actual plant control parameter calculation unit 560 acquires, from among pieces of data that are stored in the control parameter evaluation database 530, one or more optimal control parameters 532 for which the control parameter evaluation expectation values are large, and outputs the control parameter 561 for the actual plant to the control parameter database 220.

By adding Step S51 and Step S56 as described above, if in Step S3 an estimated value of the calculation time required to optimize the control parameter exceeds the limit time that is set in advance by the operator 310, the control parameter search range is reduced. Generally, since an effect of shortening the calculation time required to optimize the control parameter can be obtained by reducing the control parameter search range, the optimization of the control parameter can be completed within the time that is desired by the operator 310.

Figure 5:
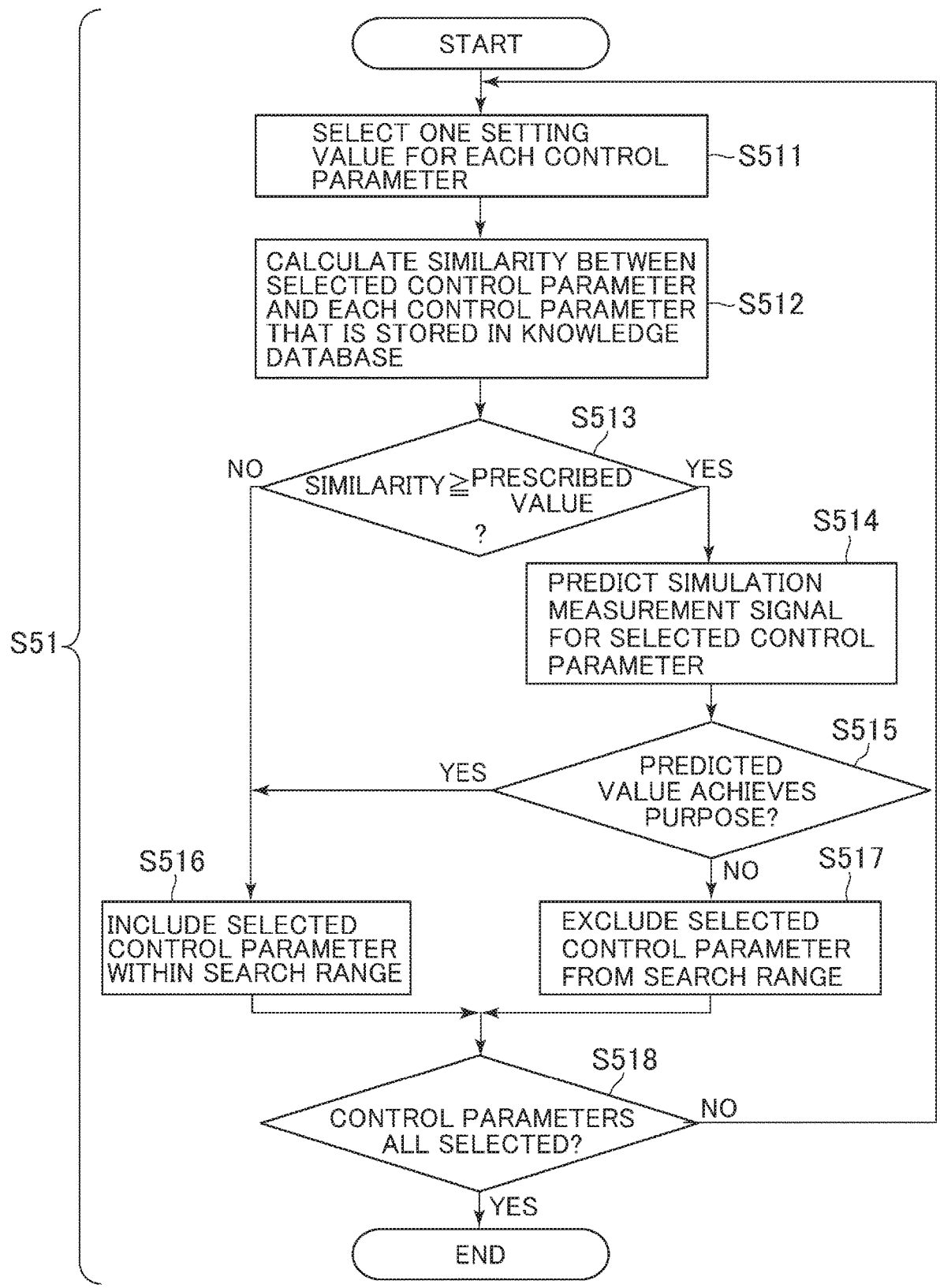
FIG. 5 is a flowchart illustrating in detail "reduce control parameter search range using search range determination unit" that is illustrated in FIG. 4.

FIG. 5 is a flowchart illustrating in detail Step 51 that is illustrated in FIG. 2. As illustrated in FIG. 5, Step S5 comprises Steps S511 to S518.

First, in Step S511, the setting value for each control parameter is selected one by one. A combination of setting values for the control parameters is one candidate for the control parameter 541 that is determined in the control parameter determination unit 540.

In Step S512, similarity D between the combination of the setting values for the control parameters that are selected in Step S511 and the combination of the setting values for the control parameters that are stored in the knowledge database 700 is calculated. The similarity D gets higher as the control parameter that is selected in Step S511 and the control parameter that is stored in the knowledge database 700 get more similar to each other, and is calculated using such as Expression (4) below.

$$D_h = \Sigma_{i=1}^{M} (P_{Khi} - P_{Ti})^2 \qquad \text{Expression (4)}$$

where, M is the number of types of control parameters, h is a value indicating which control parameter among the control parameters that are stored in the knowledge database 700, Dh is similarity between a h-th control parameter that is stored in the knowledge database 700 and the control parameter that is selected in Step S511, i is a value indicating which type of control parameter among M types of control parameters, PTi is a setting value for an i-th type of control parameter in the control parameter that is selected in Step S511, and PKhi is a setting value for the i-th type of control parameter in the h-th control parameter that is stored in the knowledge database 700.

In Step S513, it is determined whether or not one or more control parameters that have the similarity D which is equal to or greater than a prescribed value that is set in advance are present among the control parameters that are stored in the knowledge database 700. If one or more control parameters that have the similarity D which is equal to or greater than the prescribed value are present, it is determined YES. If not, it is determined NO. When determined YES in Step S513, Step S514 will be performed. When determined NO in Step S513, Step S516 will be performed. In Step S513, it is determined whether or not the simulation measurement signal 640 can be predicted in a case where the simulator 600 is put into operation using the control parameter that is selected in Step S511.

In Step S514, the simulation measurement signal 640 is predicted in the case where the simulator 600 is put into operation using the control parameter that is selected in Step S511. For the prediction, the simulation measurement signal for the control parameter that has the similarity D which is equal to or greater than the prescribed value, which signal is stored in the knowledge database 700, is used. The predicted value of the simulation measurement signal 640 is calculated using Expression (5) below.

$$O_j = \Sigma_{q=0}^{N} [D_q O'_{jq}] / N \qquad \text{Expression (5)}$$

wherein, j is a value indicating which type of signal among one or more signal types in the simulation measurement signal 640, N is the number of control parameters in the knowledge database 700 that have the similarity D which is equal to or greater than a prescribed value that is in advance, q is a value indicating which control parameter among the control parameters that have the similarity D which is equal to or greater than the prescribed value, $D_q$ is similarity between the q-th control parameter and the control parameter that is selected in Step S511, $O_j$ is a predicted value of the j-th type of signal in the simulation measurement signal 640, and $O'_{jq}$ is previous data of the j-th type of signal in the q-th simulation measurement signal 640 that is stored in the knowledge database 700.

In Step S515, it is determined whether or not the predicted value of the simulation measurement signal 640 that is calculated in Step S514 achieves a purpose. If the predicted value of the simulation measurement signal 640 achieves the purpose, it is determined YES. If not, it is determined NO. As an example, in a case where the purpose is to perform the plant operation at or below the limit value of the operation restriction condition, if it is predicted that the limit value of the operation restriction condition is satisfied, it is determined YES. If not, it is determined NO. When determined YES in Step S515, Step S516 will be performed. When determined NO in Step S515, Step S517 will be performed.

In Step S516, the control parameter that is selected in Step S511 is included within the control parameter search range. In Step S517, the control parameter that is selected in Step S511 is excluded from the control parameter search range.

In Step S518, it is determined whether or not every one of the control parameters that are selectable has been selected one or more times in Step S511. If every one of the control parameters has been selected one or more times, it is determined YES. If not, it is determined NO. When determined YES in Step S518, Step S51 is ended. When determined NO in Step S518, Step S511 will be performed again.

Figure 6:
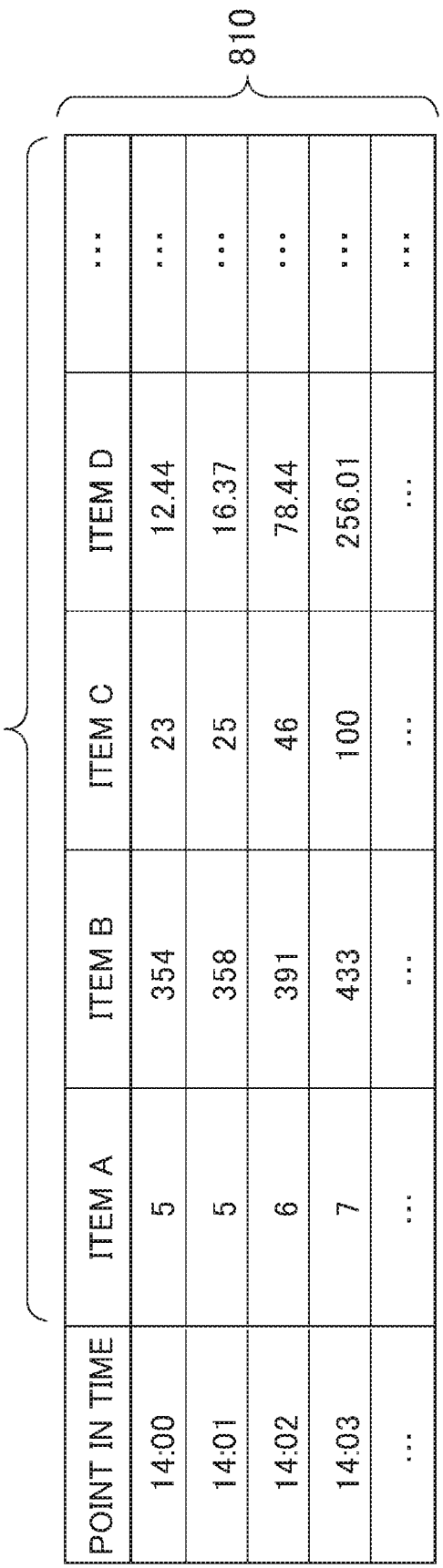
FIG. 6 is a diagram illustrating an aspect of data that is stored in an actual plant database according to the first embodiment of the present invention.

FIG. 6 is a diagram illustrating an aspect of data that is stored in the actual plant database 800 according to the present invention. As illustrated in FIG. 6, values (the operation data 810) of the measurement signal 110 (data items A, B, C, D, and so forth) that is measured in the plant 100 are stored periodically (at points in time) in the actual plant database 800.

FIG. 7 is a diagram illustrating an aspect of data that is stored in the control parameter evaluation database 530 according to the present invention. As illustrated in FIG. 7, the control parameter evaluation expectation update value 521 for each control parameter (control parameters 1 to M in the drawing) for the operation state (states A, B, C, and so forth in the drawing) is stored in the control parameter evaluation database 530. It is noted here that the operation state of the plant is the plant measurement signal before starting the plant operation or while the plant is in operation, which causes the control parameter evaluation expectation update value 521 to increase or decrease. As an example, a metal temperature of a plant apparatus or the like is given. By classifying the control parameter evaluation expectation update value 521 for every operation state of the plant, the control parameter evaluation expectation update value 521 is prevented from being changed due to a change in the operation state of the plant. According to the present embodiment, the control parameters are divided into adjustment ranges, and the control parameter evaluation expectation update value 521 is defined for each adjustment range. However, the control parameter evaluation expectation update value 521 may be defined for every feature point of the control parameter. The setting value for the control parameter according to the present embodiment is a value indicating within which adjustable range the control parameter falls.

FIG. 8 is a diagram illustrating an aspect of data that is stored in the knowledge database 700 according to the present invention. As illustrated in FIG. 8, the knowledge information that associates an amount of change in the control parameter (control parameters 1 to M in the drawing) with an amount of change (an amount of change in a state of the plant 100) in the simulation measurement signal 640 (outputs 1 to L in the drawing) is stored in the knowledge database 700. It is noted here that L is the number of signal types in the simulation measurement signal 640. The meaning of a denotation in parenthesis that is listed to the right side of the control parameter is as described in Expression (4). By storing the data formatted as described above in the knowledge database 700, the simulation measurement signal 640 can be predicted without simulation analysis using the simulator 600. Furthermore, even when a calculation load on the simulator 600 is heavy, the calculation time for the optimization can be shortened using the result of the prediction.

FIGS. 9 and 10 are diagrams each illustrating an example of a screen that is displayed on the image display device 350 when the operator 310 inputs data into the knowledge database. FIG. 9 is an example in a case where data is directly input into the knowledge database 700. FIG. 10 is an example in a case where the data is input into the knowledge database 700 using pulldown. As illustrated in FIG. 9 or 10, a knowledge information input screen 900 displays the knowledge information that is stored in the knowledge database 700, and enables the operator 310 to edit, add or delete the knowledge information. Furthermore, a vertical scroll box 901 and a horizontal scroll box 902 make it possible to scroll and display a wide range of data. While in the example that is illustrated in FIG. 9, a numerical value is input into the control parameter box or the output box, in the example that is illustrated in FIG. 10, the control parameter or the simulation measurement signal (which is described as outputs 1 to L) is selected with pulldown 903 and then a numerical value is input. The operator 310 can easily input the knowledge information into the knowledge database 700 through the knowledge information input screen 900 that is illustrated in FIG. 9 or 10. Incidentally, a method of inputting the knowledge information into the knowledge database 700 is not limited to the example that is illustrated in FIG. 9 or 10.

FIG. 11 is a diagram illustrating an example of a screen that is displayed on the image display device 350 when checking the control parameter search range that is reduced by the search range determination unit 550. As illustrated in FIG. 11, data in the control parameter evaluation database 530 is displayed on a search range reduction screen 910. The adjustment ranges in which the control parameter evaluation expectation update value 521 are not displayed are excluded from the search range. The numbers of adjustment ranges within the search range before and after reduction by the search range determination unit 550 are displayed on the amount-of-search-range-reduction display screen 911. Incidentally, a wide range of pieces of data can be scrolled for display by using a vertical scroll box 912 and a horizontal scroll box 913. The operator 310 can easily check the control parameter search range through the search range reduction screen 910 that is illustrated in FIG. 11.

Incidentally, the setting value for the control parameter that is optimized with the control parameter automatic-adjustment apparatus 400, or information that is stored in each database may be displayed in an arbitrary format on the image display device 350. For example, the time required for the optimization, which is calculated using Expression (2), may be displayed. Furthermore, a correlation between the number of search range and the time required for the optimization may be obtained using Expression (2), and the result may be plotted on a graph.

Second Embodiment

According to a second embodiment of the present invention, a case wherein the plant 100 that is illustrated in FIG.

1 is a one-shaft type combined cycle power generating plant is described. The control parameter automatic-adjustment apparatus 400 according to the present embodiment aims to activate the plant 100 as the one-shaft type combined cycle power generating plant within the shortest time while satisfying the operation restriction condition, with the optimization of the control parameter. The present invention is applied to a thermal power generating plant that is equipped with a steam turbine such as the one-shaft type combined cycle power generating plant, and thus an optimal control parameter for a plant control apparatus, which serves to minimize the plant activation time according to the metal temperature of the plant apparatus in an initial activation stage while satisfying the operation restriction condition, can be automatically searched for. Additionally, the calculation time for the optimization can be shortened by storing knowledge relating to the one-shaft type combined cycle power generating plant in the knowledge database.

Figure 12:
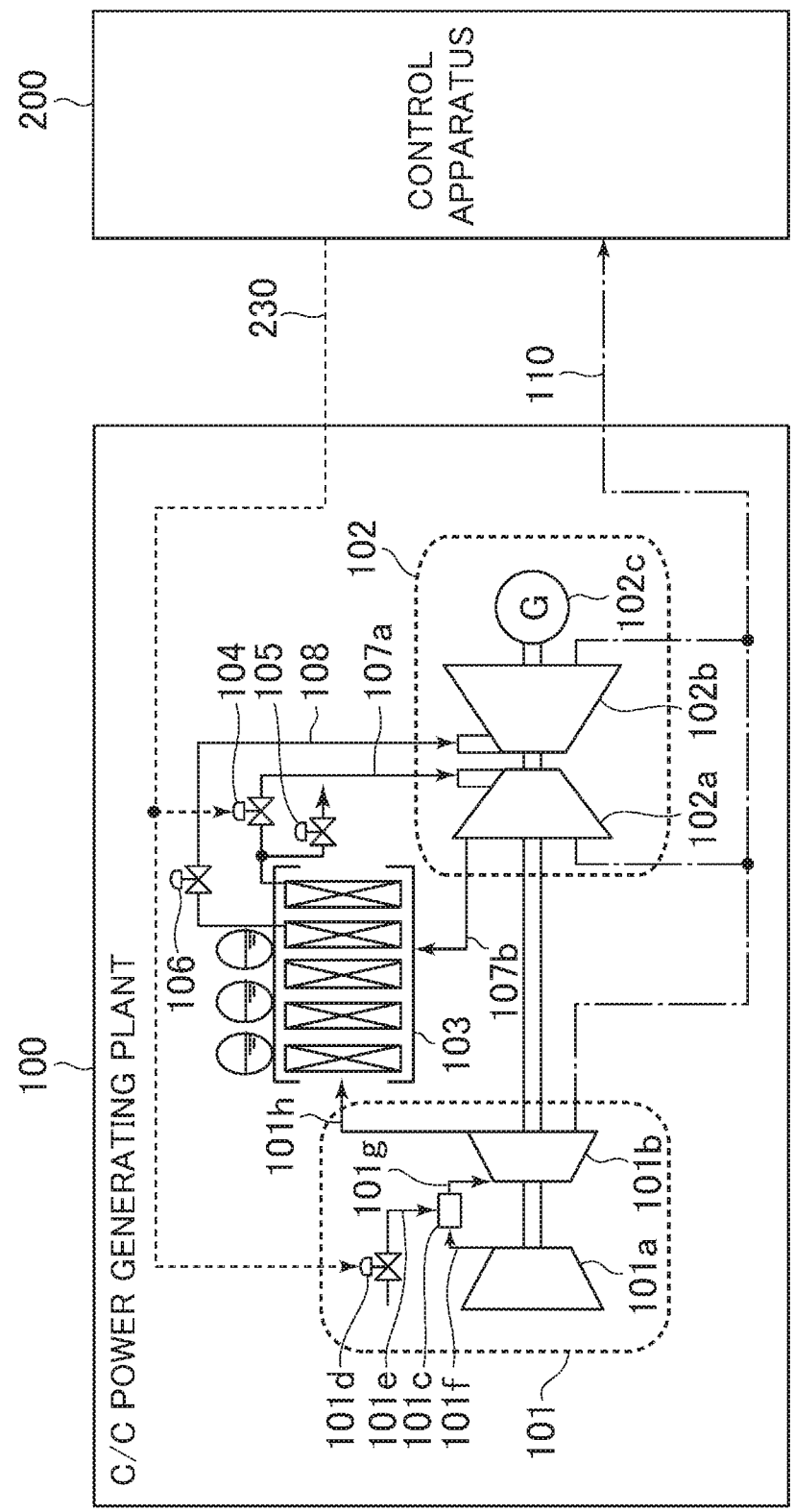
FIG. 12 is a block diagram illustrating a constitution of a plant according to a second embodiment of the present invention.

FIG. 12 is a block diagram illustrating a constitution of the plant 100 as the one-shaft type combined cycle power generating plant according to the present embodiment. As illustrated in FIG. 12, the plant 100 includes a gas turbine 101, a steam turbine 102, and an exhaust heat recovery boiler 103. Incidentally, the term "C/C" in the drawing is an abbreviation for combined cycle. In the gas turbine 101, natural gas, town gas, light oil, and the like are used as fuel 101e. A flow rate of the fuel 101e that is sent to a combustion chamber 101c is adjusted with a fuel gas control valve 101d. The degree to which the fuel gas control valve 101d is opened is controlled by the operational control signal 230 from the control apparatus 200. An air compressor 101a sends compressed air 101f to the combustion chamber. Thereafter, the fuel 101e and the compressed air 101f are combusted in the combustion chamber 101c and high-temperature gas 101g is obtained. The air compressor 101a and a turbine 101b of the gas turbine 101 are driven using the high-temperature gas 101g. In the exhaust heat recovery boiler 103, supply water is heated using exhaust gas 101h from the gas turbine 101, and two types of steam, that is, main steam 107a and reheat steam 108 are obtained. The main steam 107a is guided into a high-pressure turbine 102a of the steam turbine 102, and the main steam 107b that has finished its job in the high-pressure turbine 102a is then guided into the exhaust heat recovery boiler 103. On the other hand, the reheat steam 108 is guided into a middle- and low-pressure turbine 102b of the steam turbines 102. The steam turbine 102 is driven with the main steam 107a and the reheat steam 108. A main steam control valve 104 and a bypass control valve 105 control a load on the steam turbine by controlling a flow rate of the main steam 107a. The degree to which the main steam control valve 104 is opened is controlled by the operational control signal 230 from the control apparatus 200. Furthermore, a reheat control valve 106 controls a flow rate of the reheat steam 108. When the load on the gas turbine 101 increases, a gas turbine exhaust gas temperature increases and a temperature of the steam that is generated in the exhaust heat recovery boiler 103 increases as well. For this reason, with the control of the load on the gas turbine, the temperature of the steam can be adjusted. Furthermore, with the control of the main steam control valve 104, the flow rate of the main steam 107a that flows into the steam turbine 102 can be adjusted. The load on the gas turbine 101, or all signals, such as the metal temperature of the steam turbine 102, which are measured in the plant 100, are transmitted as the measurement signal 110 to the control apparatus 200.

Next, an activation pattern of the plant 100 is described. In the plant 100, firstly, the gas turbine 101 is activated. Accordingly, the rotation speed of a shaft that connects between the gas turbine 101 (the air compressor 101a and the turbine 101b) and the steam turbine 102 (the high-pressure turbine 102a, the middle- and low-pressure turbine 102b, and a power generator 102c) increases. Because in a process of increasing the rotation speed, gas that stays in a flue of the exhaust heat recovery boiler 103 is discharged and warms facilities, the rotation speed is maintained at a specific value over a certain period of time, and thereafter the rotation speed is increased and is set to the rated rotation speed. After the rated rotation speed is reached, the power generator 102c is connected to a power system, and provides power to the outside. With the activation of the gas turbine 101, the high-temperature exhaust gas 101h is supplied to the exhaust heat recovery boiler 103 and steam is generated. After the temperature of the steam rises to a specified temperature, the steam is supplied to the steam turbine 102. After ventilating the steam turbine 102, the load on the gas turbine 101 is repeatedly increased and maintained constant until the rated power is reached.

In the activation process described above, care must be taken to ensure that a thermal stress that occurs in a rotor of the steam turbine 102, and a difference in thermal expansion between the rotor of the steam turbine 102 and a casing portion that accommodates a turbine blade are managed at or below a limit value. The thermal stress occurs due to a difference in temperature between a surface of the rotor of the steam turbine 102 and the inside thereof. When high-temperature steam flows into the steam turbine 102 at the time of ventilating the steam turbine 102, the surface of a rotor portion of the steam turbine 102 is heated and the temperature increase. On the other hand, because a temperature of the inside increases belatedly, the difference in temperature occurs between the surface and the inside, and thus the thermal stress occurs. When a low cycle fatigue due to the thermal stress is accumulated and a limit value of a material is exceeded, a crack occurs in the rotor. Because the low cycle fatigue that is accumulated follows the history of a peak thermal stress, there is a need to activate the plant in such a manner that the peak heat stress is at or below a limit value that is set at the time of the planning.

On the other hand, the difference in thermal expansion occurs due to a difference in structure and thermal capacity between the rotor of the steam turbine 102 and the casing portion thereof. When the high-temperature steam flows into the steam turbine 102, with heating of the rotor and the casing portion, the rotor and the casing portion extend by thermal expansion particularly in the shaft direction. Since the rotor and a casing of the steam turbine 102 are different in structure and thermal capacity from each other, a difference occurs between the expansion of the rotor of the steam turbine 102 and the expansion of the casing thereof. For this reason, abrupt steam introduction encourages the difference in thermal expansion between the casing and the rotor, and causes a phenomenon in which the casing is brought into contact with the rotor. In order to avoid the contact between the casing and the rotor, a space is provided between the casing and the rotor. However, because as the space gets smaller, the power generation efficiency of the steam turbine 102 increases, there is a trade-off relationship between the length of the difference in thermal expansion, which can be absorbed, and the power generation efficiency. For this reason, there is a need to design the space in such a manner that desired efficiency is achieved, and to keep the difference in thermal expansion at the time of activating the plant to be equal to or smaller than the space between the casing and the rotor.

In addition to the thermal stress and the difference in thermal expansion, which are described above, there is a need to take into consideration activation restriction conditions, such as shaft vibration as well. The present invention makes it possible to search for the control parameter which minimizes the plant activation time while satisfying the activation restriction conditions. Incidentally, the present embodiment describes the case where the activation restriction conditions are established taking into consideration the thermal stress and the difference in thermal expansion, but the activation restriction condition may be arbitrarily established.

Figure 13:
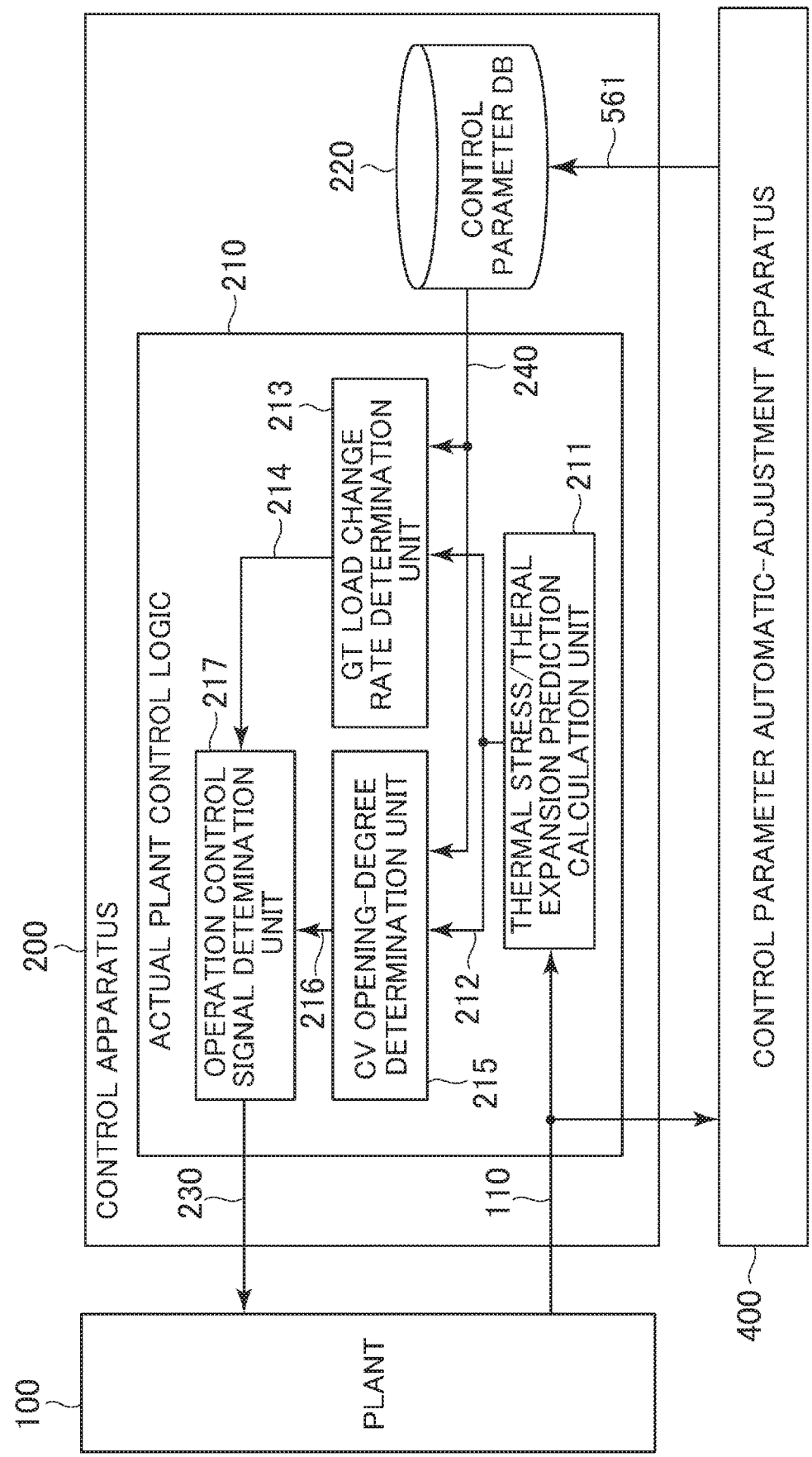
FIG. 13 is a block diagram illustrating a constitution of a control apparatus according to the second embodiment of the present invention.

The control apparatus 200 according to the present embodiment is described referring to FIG. 13. The control apparatus 200 calculates, using the measurement signal 110 from the plant 100, the operational control signal 230 that is output to the plant 100 (the main steam control valve 104 and the fuel gas control valve 101d that is illustrated in FIG. 12). The actual plant control logic 210 of the control apparatus 200 includes a thermal stress/thermal expansion prediction calculation unit 211, a GT load change rate determination unit 213, a CV opening-degree determination unit 215, and an operational control signal determination unit 217. It is noted here that the term "GT" is an abbreviation for gas turbine, and the term "CV" is an abbreviation for main steam control valve.

The thermal stress/thermal expansion prediction calculation unit 211 acquires as an input the measurement signal 110 from the plant 100, and calculates, using the plant model 620, a difference between a thermal stress limit value and a predicted value of a future thermal stress, and a difference between a thermal expansion limit value and a predicted value of a future thermal expansion. A thermal stress/thermal expansion allowance 212 as a result of the prediction calculation of the thermal stress and the thermal expansion is transmitted, as an output of the thermal stress/thermal expansion prediction calculation unit 211, to the GT load change rate determination unit 213 and the CV opening-degree determination unit 215.

The GT load change rate determination unit 213 acquires as inputs the thermal stress/thermal expansion allowance 212, and the control parameter 240 for the actual plant control logic in the control parameter database 220, calculates a load change rate instruction value 214 for the gas turbine 101, and transmits the calculated load change rate instruction value 214 to the operational control signal determination unit 217.

The CV opening-degree determination unit 215 acquires as inputs the thermal stress/thermal expansion allowance 212, and the control parameter 240 for the actual plant control logic in the control parameter database 220, and transmits an opening-degree instruction value 216 for the main steam control valve 104.

The operational control signal determination unit 217 acquires the load change rate instruction value 214 for the gas turbine 101, and the opening-degree instruction value 216 for the main steam control valve 104, and calculates the operational control signal 230.

Figure 14:
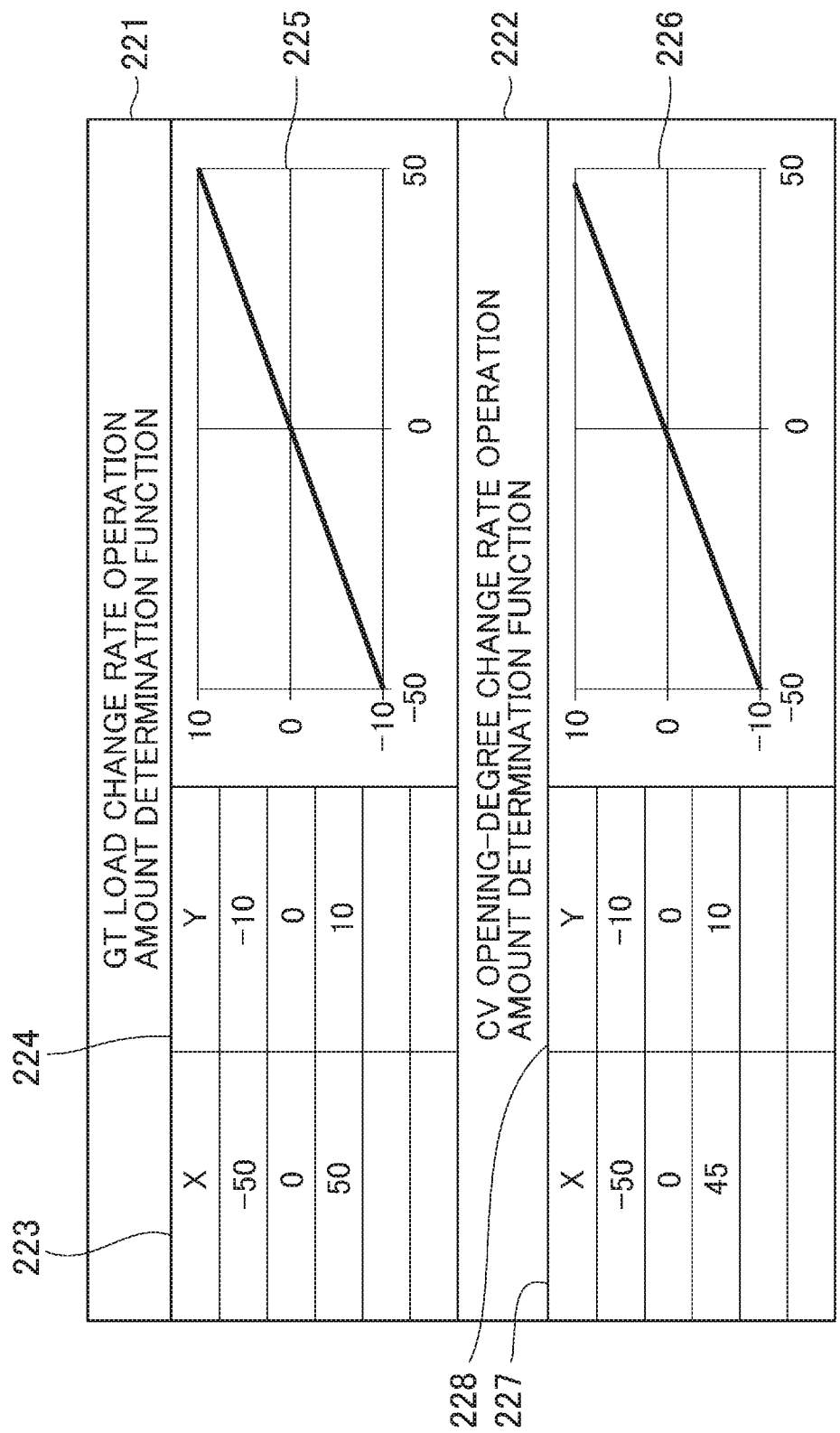
FIG. 14 is a diagram illustrating an aspect of data that is stored in a control parameter database according to the second embodiment of the present invention.

FIG. 14 is a diagram illustrating an aspect of data that is stored in the control parameter database 220 according to the present embodiment. As illustrated in FIG. 14, the control parameter database 220 stores a GT load change rate operation amount determination function 221 and a CV opening-degree change rate operation amount determination function 222. A function shape of the GT load change rate operation amount determination function 221 is defined by a load change rate operation amount 224 (Y coordinate in the drawing) of the gas turbine 101 with respect to a thermal stress allowance 223 (X coordinate in the drawing). A GT load change rate operation amount graph 225 is a graph showing the function shape of the GT load change rate operation amount determination function 221. A function shape of the CV opening-degree change rate operation amount determination function 222 is defined by an opening-degree change rate operation amount 228 (Y coordinate in the drawing) of the opening-degree instruction value 216 with respect to a thermal stress allowance 227 (X coordinate in the drawing). A CV opening-degree change rate operation amount graph 226 is a graph showing the function shape of the CV opening-degree change rate operation amount determination function 222. Incidentally, according to the present embodiment, X and Y coordinates in the function are selected as the control parameter that is adjusted in the control parameter automatic-adjustment apparatus 400, but the control parameter according to the present invention is not limited to this. Arbitrary parameters (for example, an inclination and section of the function, and the like) can be selected as the control parameters.

The control parameter automatic-adjustment apparatus 400 determines an optimal function shape by adjusting the control parameter (X and Y coordinates in the function according to the present embodiment) of each of the GT load change rate operation amount determination function 221 and the CV opening-degree change rate operation amount determination function 222 that are stored in the control parameter database 220. By optimizing the function shapes of the GT load change rate operation amount determination function 221 and the CV opening-degree change rate operation amount determination function 222, the activation time of the plant 100 can be minimized while satisfying the activation restriction condition for the plant 100. Incidentally, according to the present embodiment, the function shape of each of the GT load change rate operation amount determination function 221 and the CV opening-degree change rate operation amount determination function 222 are selected as optimization targets, but the optimization targets according to the present invention are not limited to them.

Next, the control parameter evaluation unit 510 of the control parameter automatic-adjustment apparatus 400 according to the present embodiment is described referring to FIG. 1. The control parameter evaluation unit 510 acquires signals as the simulation measurement signal 640 from the plant model 620 of the simulator 600 the signal, the signals include one or more of the following: the activation time of the plant 100; the thermal stress of the surface of the rotor of the steam turbine 102 or the inside thereof; the thermal expansion of the casing of the steam turbine 102 or the rotor thereof; and an amount of vibration of the rotor of the steam turbine 102. The control parameter evaluation unit 510 outputs the control parameter evaluation value 511 to the control parameter evaluation database update unit 520. As the plant activation time of the simulation measurement signal 640 gets shorter, the control parameter evaluation unit 510 raises the control parameter evaluation value 511. When the activation restriction condition for the plant, such as the thermal stress of the surface of the rotor of the steam turbine 102 or the inside thereof, exceeds a limit value, the control parameter evaluation unit 510 lowers the control parameter evaluation value 511. By setting the control parameter evaluation value 511 as described above, the evaluation value for the control parameter which shortens the plant activation time while satisfying the activation restriction condition for the plant increases.

An aspect of the data that is stored in the actual plant database 800 according to the present embodiment is described referring to FIG. 6. As illustrated in FIG. 6, the value (the operation data 810) of the measurement signal 110 (data items A, B, C, D, and so forth in the drawing) that is measured in the plant 100 is stored periodically (at points in time in the drawing) in the actual plant database 800. It is noted here that the measurement signal 110 includes one or more of the following: a temperature of the main steam 107a; a pressure of the main steam 107a; the flow rate of the main steam 107a; a temperature of the reheat steam 108; a pressure of the reheat steam 108; the flow rate of the reheat steam 108; a temperature of the exhaust gas 101h in the gas turbine 101 or a flow rate of the exhaust gas; a temperature of a surface of the rotor of the steam turbine 102 or the inside thereof; the thermal stress of the surface of the rotor of the steam turbine 102 or the inside thereof; and the thermal expansion of the casing of the steam turbine 102 or the rotor thereof.

An aspect of the data that is stored in the control parameter evaluation database 530 according to the present embodiment is described referring to FIG. 7. The operation state (states A, B, and C in the drawing) of the plant that is illustrated in FIG. 7 is a combination of one or more of the following: the thermal stress allowance of the rotor of the steam turbine 102 against the limit value; the point in time at which the thermal stress of the rotor of the steam turbine 102 exceeded the limit value; the metal temperature of the gas turbine 101 or the steam turbine 102; and the activation time of the plant 100. The control parameter is a function shape of the data that is stored in the control parameter database 220 or an amount of adjustment thereof.

An aspect of the data that is stored in the knowledge database 700 according to the present embodiment is described referring to FIG. 8. The control parameters 1 to M that are illustrated in FIG. 8 are a function shape of a function that is stored in the control parameter database 220 or an amount of adjustment thereof, and include as an output one or more of the following: the temperature of the main steam 107a; the pressure of the main steam 107a; the flow rate of the main steam 107a; the temperature of the reheat steam 108; the pressure of the reheat steam 108; the flow rate of the reheat steam 108; the temperature of the exhaust gas 101h in the gas turbine 101 or the flow rate of the exhaust gas; the temperature of the surface of the rotor of the steam turbine 102 or the inside thereof; the thermal stress of the surface of the rotor of the steam turbine 102 or the inside thereof; and the thermal expansion of the casing of the steam turbine 102 or the rotor thereof. By storing the information as described above in the knowledge database 700, an output can be predicted before performing simulation analysis, and the search range can be reduced using a result of the prediction. Accordingly, even when the calculation load on the simulator 600 is heavy, the calculation time for the optimization of the control parameter can be shortened with the reduction of the search range.

With the control parameter automatic-adjustment apparatus 400 according to the present embodiment, the activation time of the plant 100 as the one-shaft type combined cycle power generating plant can be shortened by optimizing the control parameter of the control apparatus 200. Furthermore, the control parameter which minimizes the plant activation time for an arbitrary initial state of the plant apparatus can be searched for by optimizing the control parameter before starting to perform an operation of activating the plant 100 as the one-shaft type combined cycle power generating plant.

Third Embodiment

Figure 15:
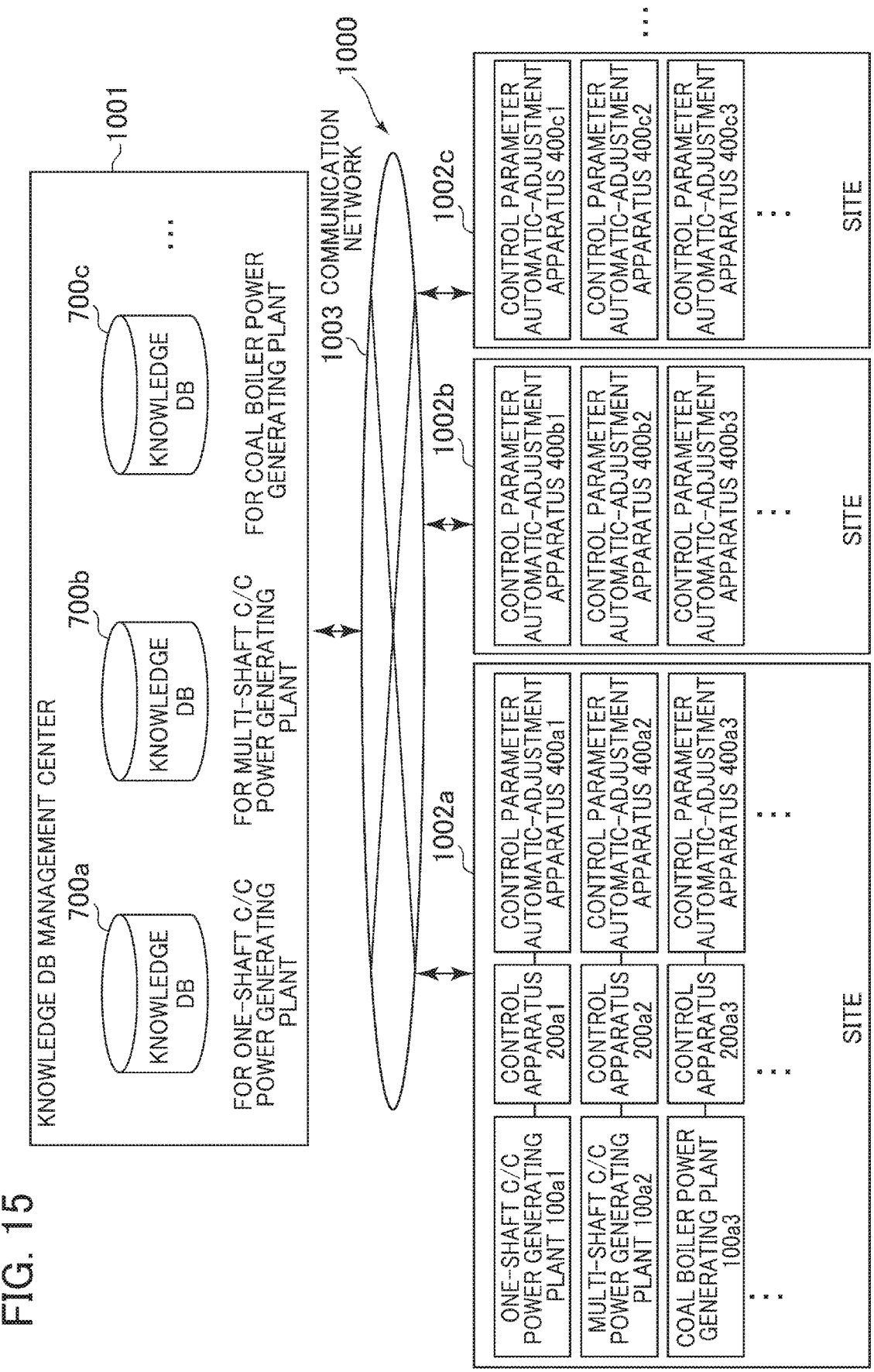
FIG. 15 is a block diagram illustrating a constitution of a control parameter automatic-adjustment apparatus network according to a third embodiment of the present invention.

FIG. 15 is a block diagram illustrating a control parameter automatic-adjustment apparatus network according to a third embodiment of the present invention. As illustrated in FIG. 15, the control parameter automatic-adjustment apparatus network 1000 includes a knowledge database management center 1001, multiple sites 1002a, 1002b, 1002c, and so forth, and a communication network 1003 that mutually connects between each of the multiple sites 1002a, 1002b, 1002c and so forth, and the knowledge database management center 1001.

The knowledge database management center 1001 keeps multiple shared knowledge databases 700a, 700b, 700c, and so forth. The shared knowledge databases 700a, 700b, 700c, and so forth respectively store the knowledge information 710 on the plants 100 that have different constitutions. In an example that is illustrated in FIG. 15, the shared knowledge database 700a stores the knowledge information 710 on the one-shaft type combined cycle power generating plant, the shared knowledge database 700b stores the knowledge information 710 on a multi-shaft type combined cycle power generating plant, and the shared knowledge database 700c stores the knowledge information 710 on a coal boiler power generating plant.

Arranged in the site 1002a are multiple plants 100a1, 100a2, 100a3, and so forth, multiple control apparatuses 200a1, 200a2, 200a3, and so forth that control the multiple plants respectively, and multiple control parameter automatic-adjustment apparatuses 400a1, 400a2, 400a3, and so forth that adjust control parameters of the multiple control apparatuses respectively.

Arranged in the site 1002b are multiple plants (not illustrated), multiple control apparatuses (not illustrated) that control the multiple plants respectively, and multiple control parameter automatic-adjustment apparatuses 400b1, 400b2, 400b3, and so forth that adjust control parameters of the multiple control apparatuses respectively.

Arranged in the site 1002c are multiple plants (not illustrated), multiple control apparatuses (not illustrated) that control the multiple plants respectively, and multiple control parameter automatic-adjustment apparatuses 400c1, 400c2, 400c3, and so forth that adjust control parameters of the multiple control apparatuses respectively.

The control parameter automatic-adjustment apparatus that is arranged in each site can access a shared knowledge database in which knowledge information on a plant that has the same constitution as or a constitution similar to that of a control-target plant, among the multiple shared knowledge databases 700a, 700b, 700c, and so forth that are arranged in the knowledge database management center 1001, through the communication network 1003. For example, since the control-target plant 100a1 is the one-shaft combined cycle power generating plant, the control parameter automatic-adjustment apparatus 400a1 that is arranged in the site 1002a can access the shared knowledge database 700a in which knowledge information on the one-shaft combined cycle power generating plant is stored. That is, the control parameter automatic-adjustment apparatus 400a1 can upload knowledge information that is acquired through management of the plant 100a1 as the one-shaft combined cycle power generating plant to the shared knowledge database 700*a*, or can download knowledge information that is stored in the shared knowledge database 700*a* to its knowledge database.

With the control parameter automatic-adjustment apparatus network 1000 according to the present embodiment, even when knowledge information that is stored in a knowledge database (not illustrated) of each of the control parameter automatic-adjustment apparatuses 400*a*1, 400*a*2, 400*a*3, and so forth is insufficient, the knowledge information on a different plant that has the same constitution as or a constitution similar to that of each of the control-target plants 100*a*1, 100*a*2, and so forth is downloaded through the communication network 1003 from any one of the multiple shared knowledge databases 700*a*, 700*b*, 700*c*, and so forth that are kept in the knowledge database management center 1001. Thus, the calculation time required to optimize the control parameter can be shortened. Furthermore, only the knowledge information is shared among the sites without exchanging pieces of actual operation data among the sites, and thus information security can be achieved.

What is claimed is:

1. A control parameter automatic-adjustment apparatus that adjusts a control parameter which is used when a control apparatus of a plant calculates an operational control signal, the apparatus comprising:
    a computer configured to:
    simulate operation of the plant; and
    search for an optimal control parameter in a simulation; and
    a knowledge database that stores knowledge information which associates an amount of change in the control parameter with an amount of change in a state of the plant,
    wherein the computer is configured to determine a control parameter search range based on the knowledge information that is stored in the knowledge database, and
    wherein the computer is configured to predict a simulation measurement signal in response to the control parameter of which similarity to a control parameter that is stored in the knowledge database is equal to or greater than a prescribed value, excludes the control parameter from the control parameter search range when a predicted value does not satisfy a prescribed purpose, and includes the control parameter within the control parameter search range when the predicted value satisfies the prescribed purpose.

2. The control parameter automatic-adjustment apparatus according to claim 1,
    wherein the computer is further configured to:
    set an evaluation value for the control parameter according to the degree to which a purpose is achieved under a restriction condition, and
    search for the control parameter for which the evaluation value is maximized.

3. The control parameter automatic-adjustment apparatus according to claim 1,
    wherein the computer is further configured to:
    calculate an estimated value of the calculation time required to optimize the control parameter, and
    reduce the control parameter search range based on the knowledge information that is stored in the knowledge database and on a predicted value of a simulation measurement signal in response to the control parameter when the estimated value of the calculation time required to optimize the control parameter exceeds a limit time that is set in advance.

4. The control parameter automatic-adjustment apparatus according to claim 1, further comprising:
    an image display device that is constituted in such a manner as to display one or more of a setting value of an optimized control parameter, an estimated value of the calculation time required to optimize the control parameter, the knowledge information that is stored in the knowledge database, a screen through which the knowledge information is input into the knowledge database, a search range that is reduced by the computer, the time required to optimize the control parameter, and a correlation between the number of search range and the time required for the optimization.

5. The control parameter automatic-adjustment apparatus according to claim 1,
    wherein the plant is a thermal power generating plant that is equipped with a steam turbine.

6. The control parameter automatic-adjustment apparatus according to claim 5,
    wherein the computer is further configured to:
    raise an evaluation value for the control parameter as a plant activation time gets shorter under an activation restriction condition, and
    search for the control parameter for which the evaluation value is maximized.

7. The control parameter automatic-adjustment apparatus according to claim 5,
    wherein the computer is further configured to:
    determine the control parameter search range based on the knowledge information that is stored in the knowledge database and on a predicted value of a simulation measurement signal in response to the control parameter, and
    estimate the calculation time required to optimize the control parameter, and
    reduce the control parameter search range when an estimated value of the calculation time required to optimize the control parameter exceeds a limit time that is set in advance.

8. The control parameter automatic-adjustment apparatus according to claim 5,
    wherein the knowledge database stores, as an amount of change in a state of the plant, one or more of a temperature of main steam, a pressure of the main steam, a flow rate of the main steam, a temperature of reheat steam, a pressure of the reheat steam, a flow rate of the reheat steam, a temperature of exhaust gas in a gas turbine or a flow rate of the exhaust gas, a temperature of a surface of a rotor of the steam turbine or an inside thereof; a thermal stress of the surface of the rotor of the steam turbine or the inside thereof, and thermal expansion of a casing of the steam turbine or the rotor thereof.

9. The control parameter automatic-adjustment apparatus according to claim 5,
    wherein the computer is configured to evaluate the control parameter based on one or more of the activation time of the plant, a thermal stress of a surface of a rotor of the steam turbine or an inside thereof, thermal expansion of a casing of the steam turbine or a rotor thereof, and an amount of vibration of the rotor of the steam turbine, which are calculated by the computer.

10. A control parameter automatic-adjustment apparatus network comprising:
    one or more sites in which one or more of the control parameter automatic-adjustment apparatuses according to the claim 1 are arranged;

a knowledge database management center in which one or more shared knowledge databases that each have the same constitutions as the knowledge databases that are included in the control parameter automatic-adjustment apparatuses according to claim 1 are kept; and a communication network that mutually connects between the sites and the knowledge database management center.

11. The control parameter automatic-adjustment apparatus network according to claim 10, wherein the knowledge database management center keeps the shared knowledge databases that each correspond to constitutions of plants that are managed in the sites.

12. A control parameter automatic-adjustment method of adjusting a control parameter that is used when a control apparatus of a plant calculates an operational control signal for the plant, the method comprising:

a learning step for searching for an optimal control parameter using a simulator;

wherein the learning step includes a search range determination step for determining a control parameter search range based on knowledge information that associates an amount of change in the control parameter with an amount of change in a state of the plant, the search range determination step includes:

a step for predicting a simulation measurement signal in response to the control parameter of which similarity to a control parameter that is stored in a knowledge database is equal to or greater than a prescribed value, a step for excluding the control parameter from the control parameter search range when a predicted value does not satisfy a prescribed purpose, and a step for including the control parameter within the control parameter search range when the predicted value satisfies the prescribed purpose.

13. The control parameter automatic-adjustment method according to claim 12, wherein the searching for an optimal control parameter further includes:

setting an evaluation value for the control parameter according to the degree to which a purpose is achieved under a restriction condition, and searching for the control parameter for which the evaluation value is maximized.

14. The control parameter automatic-adjustment method according to claim 12, wherein the determining of a control parameter search range includes:

estimating the calculation time required to optimize the control parameter, and reducing the control parameter search range based on the knowledge information that is stored in the knowledge database and on a predicted value of a simulation measurement signal of the simulator in response to the control parameter when an estimated value of the calculation time required to optimize the control parameter exceeds a limit time that is set in advance.

\* \* \* \* \*